US009349352B2

(12) United States Patent
Kato

(10) Patent No.: US 9,349,352 B2
(45) Date of Patent: May 24, 2016

(54) TRANSMISSION SYSTEM, EXTERNAL INPUT DEVICE, AND PROGRAM FOR CONVERTING DISPLAY RESOLUTION

(71) Applicant: Yoshinaga Kato, Kanagawa (JP)

(72) Inventor: Yoshinaga Kato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 2 days.

(21) Appl. No.: 14/408,360

(22) PCT Filed: Jun. 12, 2013

(86) PCT No.: PCT/JP2013/066771
§ 371 (c)(1),
(2) Date: Dec. 16, 2014

(87) PCT Pub. No.: WO2013/191190
PCT Pub. Date: Dec. 27, 2013

(65) Prior Publication Data
US 2015/0199946 A1 Jul. 16, 2015

(30) Foreign Application Priority Data
Jun. 18, 2012 (JP) ................. 2012-137129

(51) Int. Cl.
H04N 7/15 (2006.01)
G09G 5/391 (2006.01)
G09G 5/00 (2006.01)

(52) U.S. Cl.
CPC ............ G09G 5/391 (2013.01); G09G 5/006 (2013.01); H04N 7/15 (2013.01);
(Continued)

(58) Field of Classification Search
CPC ........... H04N 7/15; H04N 7/152; H04N 7/14; H04N 7/141; H04N 7/142; G09G 5/006; G09G 5/391; G09G 2340/0421; G09G 2340/0442; G09G 2340/0414; G09G 2340/0407
USPC .............. 348/14.01–14.15; 715/752; 709/204
See application file for complete search history.

(56) References Cited

U.S. PATENT DOCUMENTS

2006/0083194 A1 4/2006 Dhrimaj et al.
2006/0085753 A1* 4/2006 Vance et al. .................. 715/753
(Continued)

FOREIGN PATENT DOCUMENTS

JP 07-327219 12/1995
JP 2002-325239 11/2002
(Continued)

OTHER PUBLICATIONS

International Search Report issued Aug. 27, 2013 in PCT/JP2013/066771 filed Jun. 12, 2013.
(Continued)

Primary Examiner — Melur Ramakrishnaiah
(74) Attorney, Agent, or Firm — Oblon, McClelland, Maier & Neustadt, L.L.P.

(57) ABSTRACT

A transmission system includes an external input device which transmits display data to a transmission terminal that is connected to another transmission terminal to be able to communicate therewith. Once the resolution on a display device of the transmission terminal has been modified, the external input device receives first resolution information representing the resolution that has been modified from the transmission terminal, and thereafter converts the resolution of the display data based on the first resolution information and second resolution information representing the resolution on a display device of the external input device. The external input device then transmits the display data that has the converted resolution to the transmission terminal so that the transmission terminal transmits the display data to the other transmission terminal.

13 Claims, 25 Drawing Sheets

(52) U.S. Cl.
CPC ........... *G09G 2340/0407* (2013.01); *G09G 2340/0414* (2013.01); *G09G 2340/0421* (2013.01); *G09G 2340/0442* (2013.01)

(56) References Cited

U.S. PATENT DOCUMENTS

| | | |
|---|---|---|
| 2008/0140886 A1 | 6/2008 | Izutsu |
| 2008/0192141 A1 | 8/2008 | Aoki |
| 2010/0077114 A1 | 3/2010 | Izutsu |
| 2010/0110294 A1 | 5/2010 | Oka |
| 2011/0183713 A1 | 7/2011 | Izutsu |
| 2012/0019534 A1 | 1/2012 | Aoki |
| 2012/0140021 A1 | 6/2012 | Tanaka et al. |
| 2012/0140022 A1 | 6/2012 | Kato et al. |
| 2012/0147127 A1* | 6/2012 | Satterlee et al. ........... 348/14.08 |
| 2012/0252537 A1 | 10/2012 | Izutsu |
| 2013/0060926 A1 | 3/2013 | Kato et al. |
| 2013/0106988 A1* | 5/2013 | Davis et al. ............... 348/14.09 |
| 2013/0242030 A1 | 9/2013 | Kato et al. |
| 2014/0043431 A1 | 2/2014 | Kato |
| 2014/0184473 A1 | 7/2014 | Aoki |
| 2014/0253676 A1 | 9/2014 | Nagase et al. |

FOREIGN PATENT DOCUMENTS

| | | |
|---|---|---|
| JP | 2006-106371 | 4/2006 |
| JP | 2008-517525 | 5/2008 |
| JP | 2010-028541 | 2/2010 |
| JP | 2011-066585 | 3/2011 |
| JP | 2011-258210 | 12/2011 |
| JP | 2012-237964 | 12/2012 |
| JP | 2013-051664 | 3/2013 |
| JP | 2013-197800 | 9/2013 |

OTHER PUBLICATIONS

Extended European Search Report issued Mar. 11, 2015 in Patent Application No. 13806252.6.

* cited by examiner

FIG.6

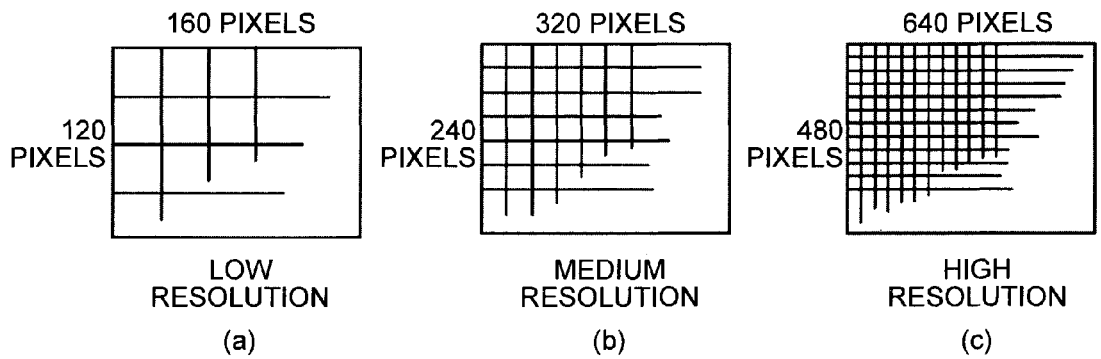

(a) LOW RESOLUTION — 160 PIXELS × 120 PIXELS
(b) MEDIUM RESOLUTION — 320 PIXELS × 240 PIXELS
(c) HIGH RESOLUTION — 640 PIXELS × 480 PIXELS

FIG.7

<QUALITY MODIFICATION MANAGEMENT TABLE>

| IP ADDRESS OF TERMINAL TO WHICH DATA IS RELAYED | IMAGE QUALITY OF IMAGE DATA TO BE RELAYED |
|---|---|
| 1.3.2.4 | HIGH IMAGE QUALITY |
| 1.3.1.3 | LOW IMAGE QUALITY |
| 1.3.4.3 | MEDIUM IMAGE QUALITY |
| ... | ... |

FIG.8

<RELAY DEVICE MANAGEMENT TABLE>

| RELAY DEVICE ID | OPERATION STATE | RECEPTION DATE AND TIME | IP ADDRESS OF RELAY DEVICE | MAXIMUM DATA TRANSMISSION RATE [Mbps] |
|---|---|---|---|---|
| 111a | ON LINE | 2009.11.10.13:00 | 1.2.1.2 | 100 |
| 111b | ON LINE | 2009.11.10.13:10 | 1.2.2.2 | 1000 |
| 111c | OFF LINE | 2009.11.10.13:20 | 1.3.1.2 | 100 |
| 111d | ON LINE | 2009.11.10.13:30 | 1.3.2.2 | 10 |

FIG.9

<TERMINAL AUTHENTICATION MANAGEMENT TABLE>

| TERMINAL ID | PASSWORD |
|---|---|
| 01aa | aaaa |
| 01ab | abab |
| 01ba | baba |
| ... | ... |

FIG.10

<TERMINAL MANAGEMENT TABLE>

| TERMINAL ID | OPERATION STATE | RECEPTION DATE AND TIME | IP ADDRESS OF TERMINAL |
|---|---|---|---|
| 01aa | ON LINE | 2009.11.10.13:40 | 1.2.1.3 |
| 01ab | OFF LINE | 2009.11.09.12:00 | 1.2.1.4 |
| 01ba | ON LINE | 2009.11.10.13:45 | 1.2.2.3 |
| ... | ... | ... | ... |
| 01db | ON LINE | 2009.11.10.13:50 | 1.3.2.4 |

FIG.11

<DESTINATION LIST MANAGEMENT TABLE>

| REQUESTOR TERMINAL ID | DESTINATION TERMINAL ID |
|---|---|
| 01aa | 01ab, 01ba, 01db |
| 01ab | 01aa, 01ba, 01ca |
| 01ba | 01aa, 01ab, 01cb, 01da |
| ... | ... |
| 01db | 01aa, 01ab, 01da |

FIG.12

<SESSION MANAGEMENT TABLE>

| SELECTION SESSION ID | RELAY DEVICE ID | REQUESTOR TERMINAL ID | DESTINATION TERMINAL ID | DELAY TIME [ms] | DATE AND TIME WHEN DELAY INFORMATION IS RECEIVED |
|---|---|---|---|---|---|
| se1 | 111a | 01aa | 01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| ... | ... | ... | ... | ... | ... |

FIG.13

<ADDRESS PRIORITY MANAGEMENT TABLE>

| IDENTITY/DIFFERENCE WITHIN DOT ADDRESS PORTION | ADDRESS PRIORITY |
|---|---|
| IDENTICAL.IDENTICAL.IDENTICAL.DIFFERENT | 5 |
| IDENTICAL.IDENTICAL.DIFFERENT.- | 3 |
| IDENTICAL.DIFFERENT.-.- | 1 |
| DIFFERENT.-.-.- | 0 |

FIG.14

<TRANSMISSION RATE PRIORITY MANAGEMENT TABLE>

| MAXIMUM DATA TRANSMISSION RATE OF RELAY DEVICE [Mbps] | TRANSMISSION RATE PRIORITY |
|---|---|
| 1000 TO | 5 |
| 100 TO 1000 | 3 |
| 10 TO 100 | 1 |
| TO 10 | 0 |

FIG.15

<QUALITY MANAGEMENT TABLE>

| DELAY TIME [ms] | IMAGE QUALITY OF IMAGE DATA |
|---|---|
| 0 TO 100 | HIGH IMAGE QUALITY |
| 100 TO 300 | MEDIUM IMAGE QUALITY |
| 300 TO 500 | LOW IMAGE QUALITY |
| 500 TO | (INTERRUPT) |

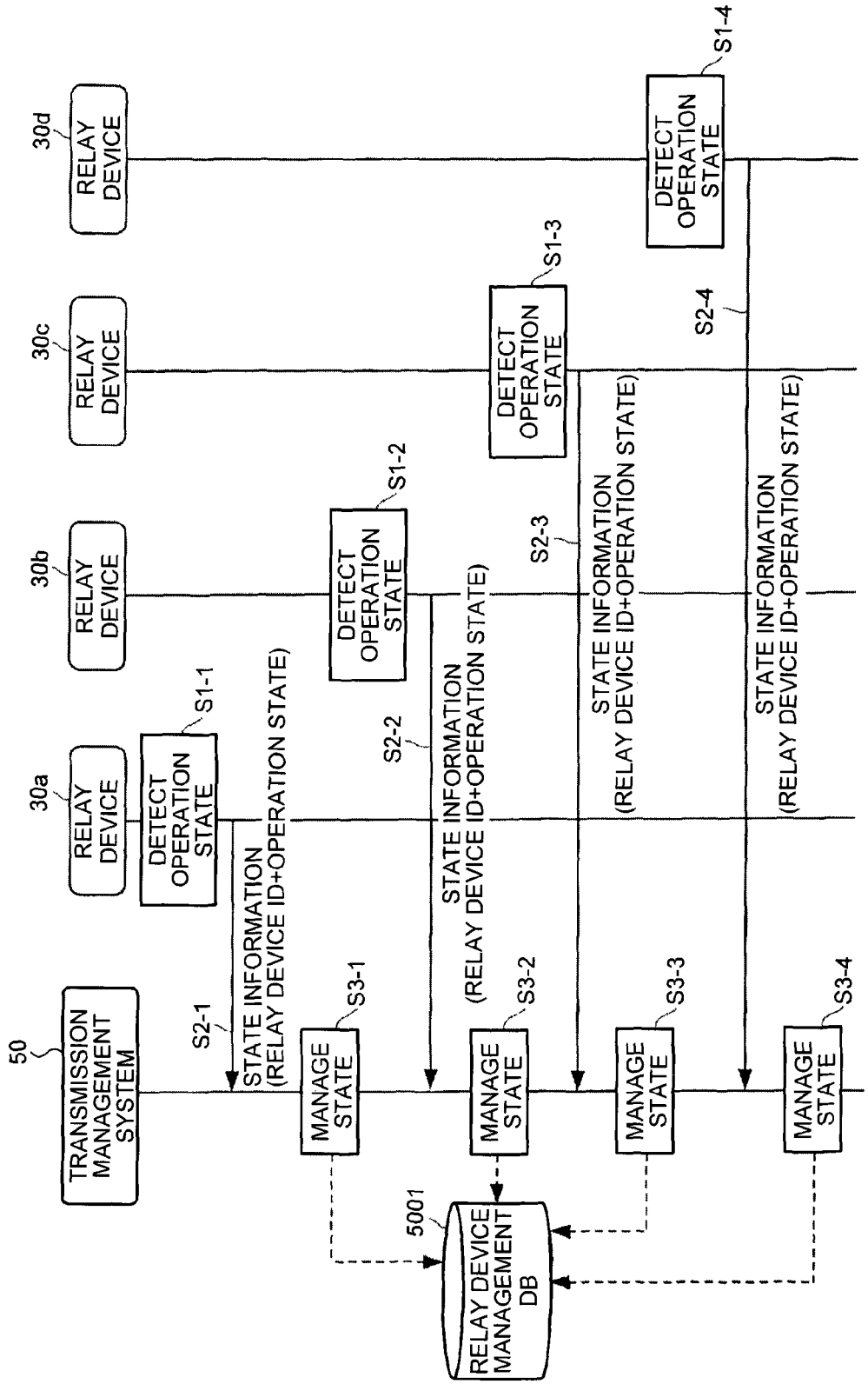

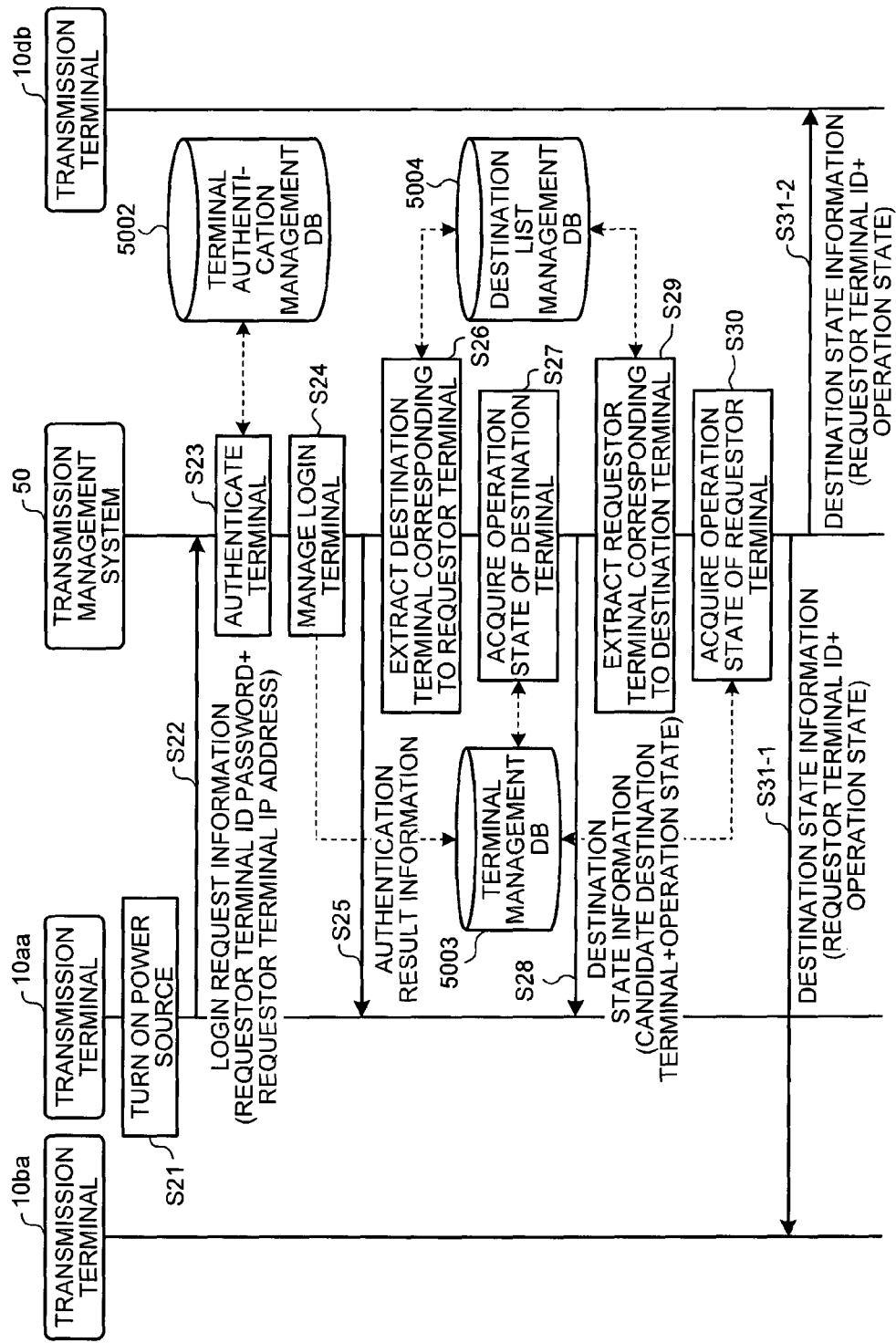

FIG.20

| RELAY DEVICE ID | ADDRESS PRIORITY | | TRANSMISSION RATE PRIORITY POINT | OVERALL POINT |
|---|---|---|---|---|
| | POINT FOR TERMINAL 10aa | POINT FOR TERMINAL 10db | | |
| 111a | 5 | 1 | 3 | 8 |
| 111b | 3 | 1 | 5 | 8 |
| 111c | - | - | - | - |
| 111d | 1 | 5 | 1 | 6 |

| RESOLUTION (WIDTH) | RESOLUTION (HEIGHT) |
|---|---|
| 1024 | 768 |

FIG.32
(a)
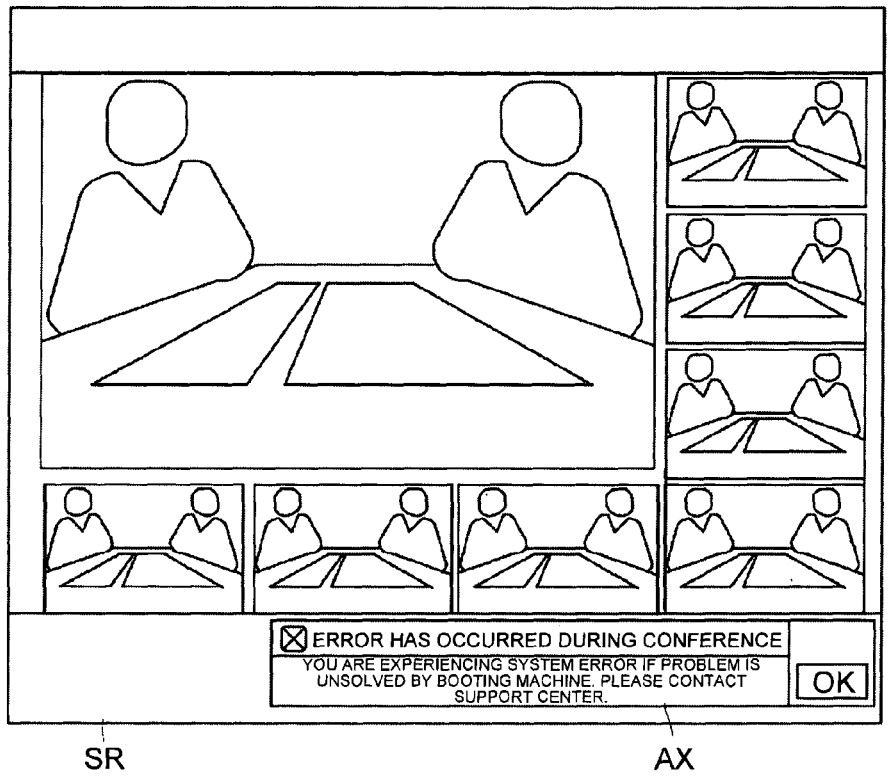
SR　　　　　　　　　　　　　　AX
(b)
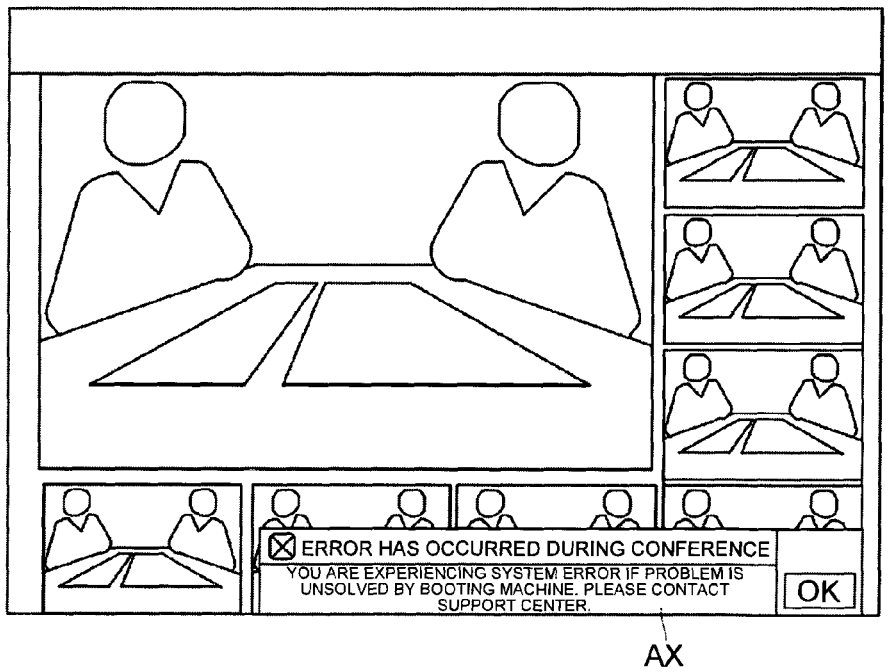
AX

TRANSMISSION SYSTEM, EXTERNAL INPUT DEVICE, AND PROGRAM FOR CONVERTING DISPLAY RESOLUTION

TECHNICAL FIELD

The present invention relates to a transmission system adapted to transmit display data displayed in an external input device that is connected to a transmission terminal to another transmission terminal via a communication network.

BACKGROUND ART

In recent years, a transmission system that conducts a television conference via a communication network, for example the Internet, have spread. In such a transmission conference system, image data and audio data are transmitted/received among a plurality of transmission terminals to realize the television conference.

The enhancement of broadband environment in recent years has allowed for the transmission/reception of high-quality image data and high-quality voice data. Therefore, one can recognize a state of the other one in the telephone conference more easily and have a much better communication through conversation.

When the telephone conference is held by using a transmission terminal, the participants in the telephone conference sometimes uses an external input device, for example an individual PC (Personal Computer), in addition to the transmission terminal, in order to have a discussion or the like with the other-one who attends the conference, by displaying an image of conference materials or the like on a display of the external input device. In this case, conventionally, a conventional external input device has transmitted, to a transmission terminal used by the other one who attends the telephone conference via the communication network, display data generating the image of the conference materials or the like to be displayed on the display of the external input device.

Accordingly, the participants in the telephone conference can hear a voice of the other one who attends the telephone conference and see an image of his or her face, which are generated by the voice data and the image data transmitted/received through the transmission terminal while the conference is held. Also, the participants in the telephone conference can share the image of the display data that is displayed on the display of the external input device with the other one who attends the telephone conference.

Another technology pertaining to sharing the image of the display data among transmission terminals appears, for example, Japanese Patent No. 4738628, which is incorporated herein by reference in its entirety. A data conference system disclosed in the Patent Literature includes a terminal and a remote terminal connected to the terminal. In the data conference system disclosed in the Patent Literature, an image displayed on a display screen by an application program used by the terminal is captured by a graphical device interface and transmitted to the remote terminal, so that the image displayed on the display screen is shared with the terminal and the remote terminal. Display resolution information of the remote terminal is stored in the terminal, so that the resolution of the captured data is converted based on the display resolution information for the entire display screen before the captured data is transmitted to the remote terminal.

However, a conventionally known external input device imposed a limitation on the resolution of an image that is supported at a transmission terminal. Therefore, when a user desires to share the image of the display data, the resolution of the external input device need to be modified so as to conform with the resolution supported by the transmission terminal. This disadvantageously leads a lot of time and effort for operating the external input device.

A similar problem can occur in the data conference system described in the Patent Literature. In a case where data for display in the external input device connected to his/her own terminal is transmitted to the other terminal, a user is required to change the setting for the resolution of the external input device, so that the user suffers from the burden on operation.

The present invention has been created in consideration of the aforementioned conventional problems. An object of the present invention is to reduce the burden of user operation by enabling the image of the display data to be shared with another transmission terminal without requiring the change of the resolution in the external input device by the user.

DISCLOSURE OF INVENTION

According to an aspect of the present invention, a transmission system including a transmission terminal; and a display device, another transmission terminal and an external input device that are each connected to the terminal device, is provided. The transmission terminal comprises: resolution acquisition unit configured to acquire a resolution available for the display device; resolution modification unit configured to modify a resolution of the display device to a resolution selected from among the resolution available for the display device acquired by the resolution acquisition unit; and resolution information transmission unit configured to transmit first resolution information, when the resolution of the display device has been modified by the resolution modification unit, to the external input device, the first resolution information representing the modified resolution. The external input device comprises: resolution information reception unit configured to receive the first resolution information transmitted from the resolution information transmission unit; resolution conversion unit for converting a resolution of the display data based on the first resolution information and second resolution information representing a resolution on a display device of the external input device; and display data transmission unit configured to transmit the display data whose resolution has been converted by the resolution conversion unit, to the transmission terminal in order to let the transmission terminal transmit the converted resolution to the other transmission terminal.

According to the present invention, the burden of user on operation can be reduced by enabling the image of the display data to be shared with another transmission terminal without requiring the change of the resolution in the external input device by the user.

BRIEF DESCRIPTION OF DRAWINGS

FIGS. 6(*a*) to 6(*c*) are respectively schematic diagram illustrating image quality of image data.

FIG. 7 is a table illustrating an example of a quality modification management table.

FIG. 8 is a table illustrating an example of a relay device management table.

FIG. 9 is a table illustrating an example of a terminal authentication management table.

FIG. 10 is a table illustrating an example of a terminal management table.

FIG. 11 is a table illustrating an example of a destination list management table.

FIG. 12 is a table illustrating an example of session management table.

FIG. 13 is a table illustrating an example of an address priority management table.

FIG. 14 is a table illustrating an example of a transmission rate priority management table.

FIG. 15 is a table illustrating an example of a quality management table.

FIG. 16 is a sequence diagram illustrating an example of a process that manages state information representing an operation state of each relay device.

FIG. 17 is a sequence diagram illustrating an example of a process performed in a preparatory phase before communication is established among each transmission terminal.

FIG. 20 is a table illustrating a priority point calculated in order to execute the process of selecting a relay device to be used.

FIGS. 32(*a*) and 32(*b*) are diagrams explaining a determination process performed in step S102 of FIG. 31 and illustrating an example of a screen on which auxiliary information is displayed when a segment region is added (FIG. 32(*a*)) and not added (FIG. 32(*b*)).

BEST MODES FOR CARRYING OUT THE INVENTION

Embodiments of the present invention will now be described with reference to drawings.

<Overall Configuration of Embodiment>

Figure 1:
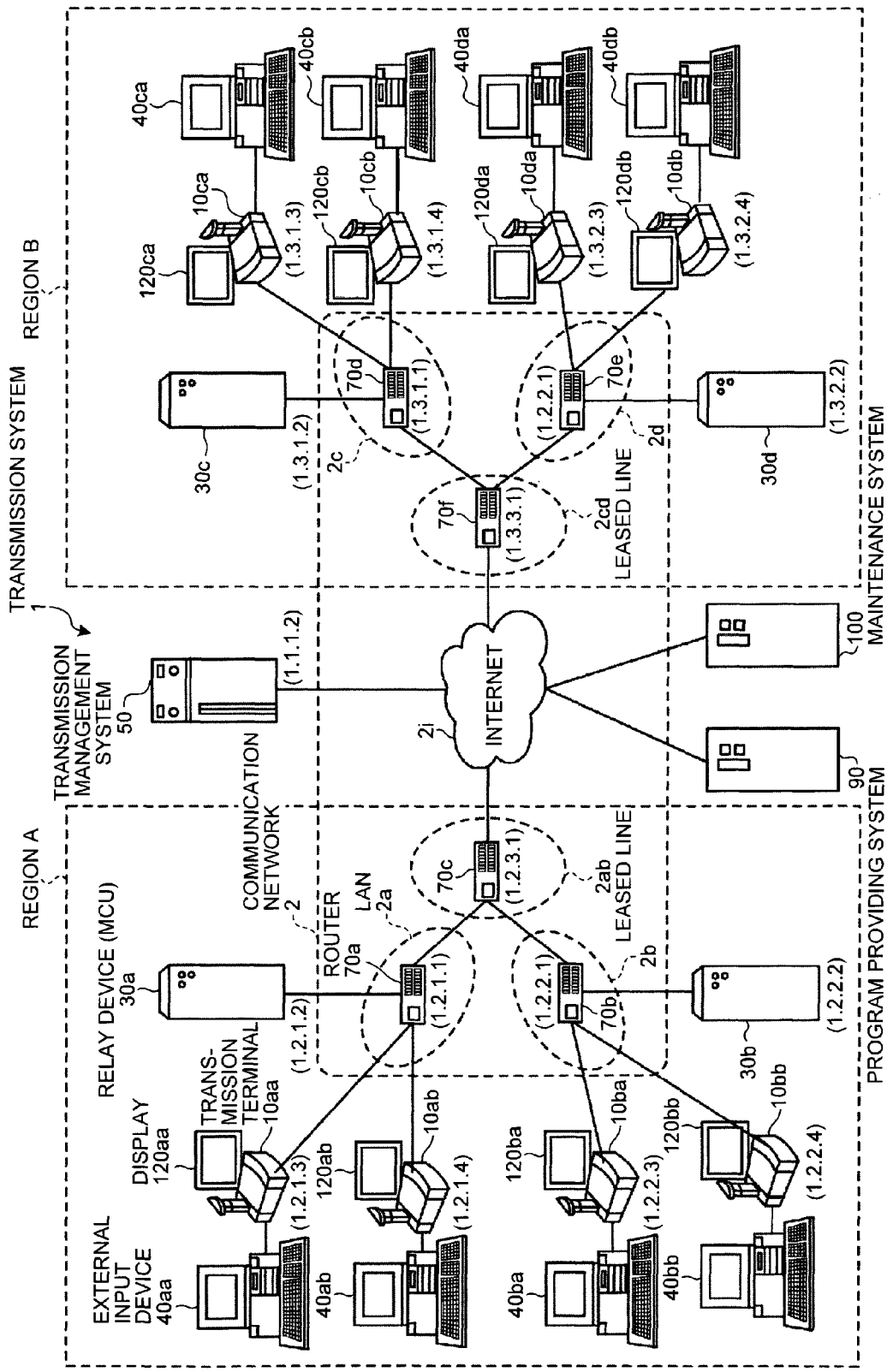
FIG. 1 is a schematic diagram illustrating an overall configuration of a transmission system according to an embodiment of the present invention.

FIG. 1 shows the overall configuration of a transmission system 1 according to an embodiment of the present invention. The present embodiment will be described below with reference to FIG. 1.

Generally, a transmission system includes: a data providing system which communicates content data from one transmission terminal to another transmission terminal with a transmission management system in one-way manner; and a communication system in which a plurality of transmission terminals communicates information, emotion and the like each other with a transmission management system. The communication system is a system in which a plurality of communication terminals (equivalent to the "transmission terminal") communicates information, emotion and the like each other with a communication management system (equivalent to the "transmission management system"). The communication system may be a television or video conference system, a videophone system, a voice conference system, a voice phone system, or a PC (Personal computer) screen sharing system, for example.

In the embodiment, a transmission system, a transmission management system, and a transmission terminal will be described based on a television conference system as an example of the communication system, a television or video conference management system as an example of the communication management system, and a television video conference terminal as an example of the communication terminal. That is, the transmission terminal and the transmission management system of the embodiment are not only applied to a television or video conference system, but also to a communication system and a transmission system.

The transmission system 1 (see FIG. 1) according to the present embodiment includes: a plurality of transmission terminals 10*aa*, 10*ab*, 10*ba*, 10*bb*, 10*ca*, 10*cb*, 10*da*, and 10*db*; a plurality of displays 120*aa*, 120*ab*, 120*ba*, 120*bb*, 120*ca*, 120*cb*, 120*da*, and 120*db* corresponding to the respective transmission terminals; a plurality of external input devices 40*aa*, 40*ab*, 40*ba*, 40*bb*, 40*ca*, 40*cb*, 40*da*, and 40*db* for example a PC that is connected to the respective transmission terminals; a plurality of relay devices 30*a*, 30*b*, 30*c*, and 30*d*; a transmission management system 50; a program providing system 90; and a maintenance system 100.

Note that, hereinafter, any of the plurality of transmission terminals 10*aa* to 10*db* will be simply referred to as a "transmission terminal 10", any of the plurality of displays 120*aa* to 120*db* will be simply referred to as a "display 120", any of the plurality of external input devices 40aa to 40db will be simply referred to as an "external input device 40", and any of the plurality of relay devices 30a to 30d will be simply referred to as a "relay device 30", unless otherwise specified. The display 120 is an example of a display device included in the transmission terminal 10.

The transmission terminal 10 transmits and receives image data and voice data to/from another transmission terminal 10. An image generated by the image data in the present embodiment may be a video image or still image, or may be both of the video image and the still image. The relay device 30 relays the image data and the voice data between the transmission terminals 10. The transmission management system 50 collectively manages the plurality of transmission terminals 10 and the plurality of relay devices 30.

The external input device 40 is connected to the transmission terminal 10 and transmits display data representing an image displayed in a display device (a display 216 to be described) of the external input device 40 to the transmission terminal 10.

A plurality of routers 70a, 70b, 70c, 70d, 70e, and 70f illustrated in FIG. 1 selects an optimal path through which the image data and the voice data are transmitted/received. Hereinafter, any of the plurality of routers 70a to 70f will be simply referred to as a "router 70" unless otherwise specified. The program providing system 90 includes an HD (Hard Disk) (not illustrated). The HD stores therein a program for transmission terminal which allows the transmission terminal 10 to implement various functions and means, a program for relay device which allows the relay device 30 to implement various functions and means, and a program for transmission management which allows the transmission management system 50 to implement various functions and means. The program providing system 90 is configured to be able to transmit the program for transmission terminal, the program for relay device, and the program for transmission management that are stored in the HD, to the transmission terminal 10, the relay device 30, and the transmission management system 50, respectively.

The transmission terminals 10aa and 10ab, the relay device 30a, and the router 70a are connected by a LAN (Local Area Network) 2a capable of communicating with each other, while the transmission terminals 10ba and 10bb, the relay device 30b, and the router 70b are connected by a LAN 2b capable of communicating with each other. The LANs 2a and 2b are connected by a leased line 2ab including the router 70c so that they can communicate with each other, and are built in a predetermined region A. The region A may be Japan, for example, the LAN 2a is may be built in a Tokyo office, and the LAN 2b may be built in an Osaka office.

On the other hand, the transmission terminals 10ca and 10cb, the relay device 30c, and the router 70d are connected by a LAN 2c so that they can communicate with each other. The transmission terminals 10da and 10db, the relay device 30d, and the router 70e are connected by a LAN 2d so that they can communicate with each other. The LANs 2c and 2d are connected by a leased line 2cd including the router 70f so that they can communicate with each other, and are built in a predetermined region B. The region B may be the United States of America, for example, the LAN 2c is built in a New York office, and the LAN 2d is built in a Washington D.C. office. The region A is connected to the Internet 2i through the router 70c and the region B is also connected to the Internet 2i through the router 70f, so that the region A and the region B can communicate with each other.

The transmission management system 50, the program providing system 90, and the maintenance system 100 are connected to the transmission terminal 10 and the relay device 30 via the Internet 2i so that they can communicate with each other. The transmission management system 50, the program providing system 90, and the maintenance system 100 may be installed in the region A or B, or in another region.

In the present embodiment, a communication network 2 is configured with the LANs 2a and 2b, the leased line 2ab, the Internet 2i, the leased line 2cd, and the LANs 2c and 2d.

As illustrated in FIG. 1, each four numbers (noted in parenthesis) at the bottom of the each transmission terminal 10, the each relay device 30, the transmission management system 50, the each router 70, the program providing system 90 and the maintenance system 100 indicates a simplified IP address of a general IPv4 (Internet Protocol version 4) for the above-mentioned device or system. The IP address for the transmission terminal 10aa is "1.2.1.3", for example. Although IPv6 may be used in place of the IPv4, the IPv4 is used below for the simplification of description.

<Hardware Configuration of Embodiment>

A hardware configuration of the present embodiment will now be described.

Figure 2:
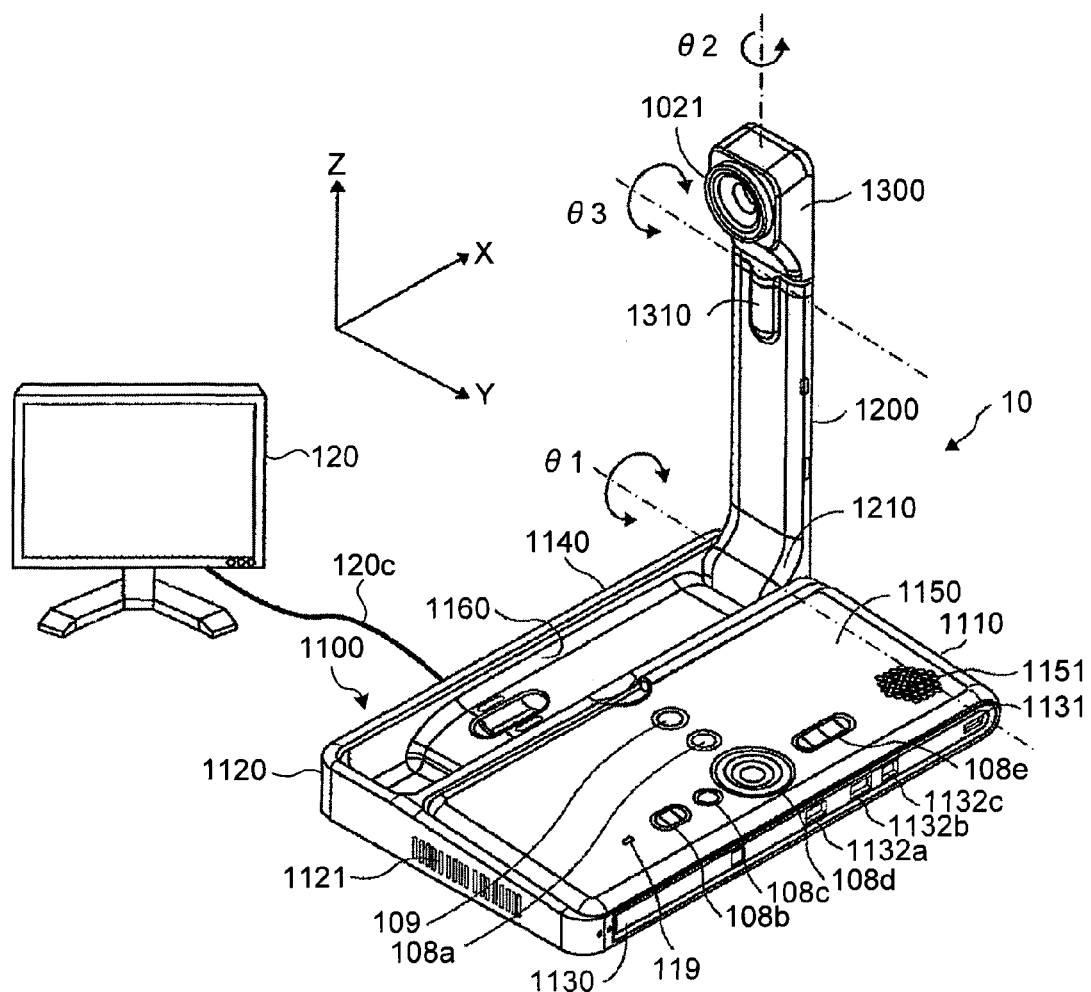
FIG. 2 is a perspective view of a transmission terminal constituting the transmission system illustrated in FIG. 1.

FIG. 2 shows an exemplary transmission terminal 10 constituting the transmission system 1 according to the present embodiment. Note that, hereinafter, the longitudinal direction of the transmission terminal 10 is referred to as an X-axis direction, a direction perpendicular to the X-axis direction in a horizontal plane is referred to as a Y-axis direction, and a direction perpendicular to the X-axis direction and the Y-axis direction (vertical direction) is referred to as a Z-axis direction.

As illustrated in FIG. 2, the transmission terminal 10 includes a housing 1100, an arm 1200, and a camera housing 1300. An inlet plane (not shown) in which a plurality of inlet holes are formed is provided on a front-side wall plane 1110 of the housing 1100, and an outlet plane 1121 in which a plurality of outlet holes are formed is provided on a rear-side wall 1120 of the housing 1100. With this structure, ambient air can be introduced into the terminal 10 from a front of the terminal through an inlet plane (not shown), and discharged to a rear of the terminal through the outlet plane 1121, by driving a cooling fan built in the housing 1100. A sound pickup hole 1131 is formed on a right-side wall plane 1130 of the housing 1100, and a sound like a voice, an audio, and a noise, can be picked up by a built-in microphone 114 described below.

An operation panel 1150 is formed on a surface of the housing 1100 at a side of the right-side wall plane 1130. The operation panel 1150 is provided with a plurality of operation buttons (108a to 108e), a power supply switch 109, and an alarm lamp 119, and a sound output 1151 is formed with a plurality of audio output holes for allowing the audio output from a built-in speaker 115 to pass through. A housing unit 1160 with a recess for resting the arm 1200 and the camera housing 1300 is formed on the surface of the housing 1140 at a side of a left-side wall plane 1140. A plurality of connection ports (1132a to 1132c) for electrically connecting a cable to an external equipment connection I/F 118 are provided on the right-side wall plane 1130 of the housing 1100. On the other hand, a connection port (not shown) for electrically connecting a cable 126c for a display 120 to a display I/F 117 described below is provided on the left-side wall plane 1140 of the housing 1100.

Note that, hereinafter, any operation button from among the operation buttons (108a to 108e) is referred to as an "operation button 108", and any connection port from among the connection ports (1132a to 1132c) is referred to as a "connection port 1132."

The arm 1200 is attached to the housing 1100 with a torque hinge 1210, so that the arm is rotatable up and down within a range of a tilt angle θ1 of 135 degrees relative to the housing 1100. FIG. 2 illustrates a state where the tilt angle θ1 is 90 degrees.

A built-in camera 1021 is provided inside the camera housing 1300, and can take an image of a user, a document, a room and the like. Also, a torque hinge 1310 is formed inside the camera housing 1300. The camera housing 1300 is attached to the arm 1200 with the torque hinge 1310. More specifically, the camera housing 1300 is attached to the arm 1200 with the torque hinge 1310, so that the camera housing 1300 is rotatable vertically up and down and horizontally right and left within the range of a pan angle θ2 of ±180 degrees and of a tilt angle θ3 of ±45 degrees relative to the arm 1200, if an angle of the arm 1200 illustrated in FIG. 2 is defined as 0 degrees.

Note that the description of an external appearance of each of the relay device 30, the transmission management system 50, and the program providing system 90 are omitted since the external appearance thereof is similar to that of a general server computer.

Figure 3:
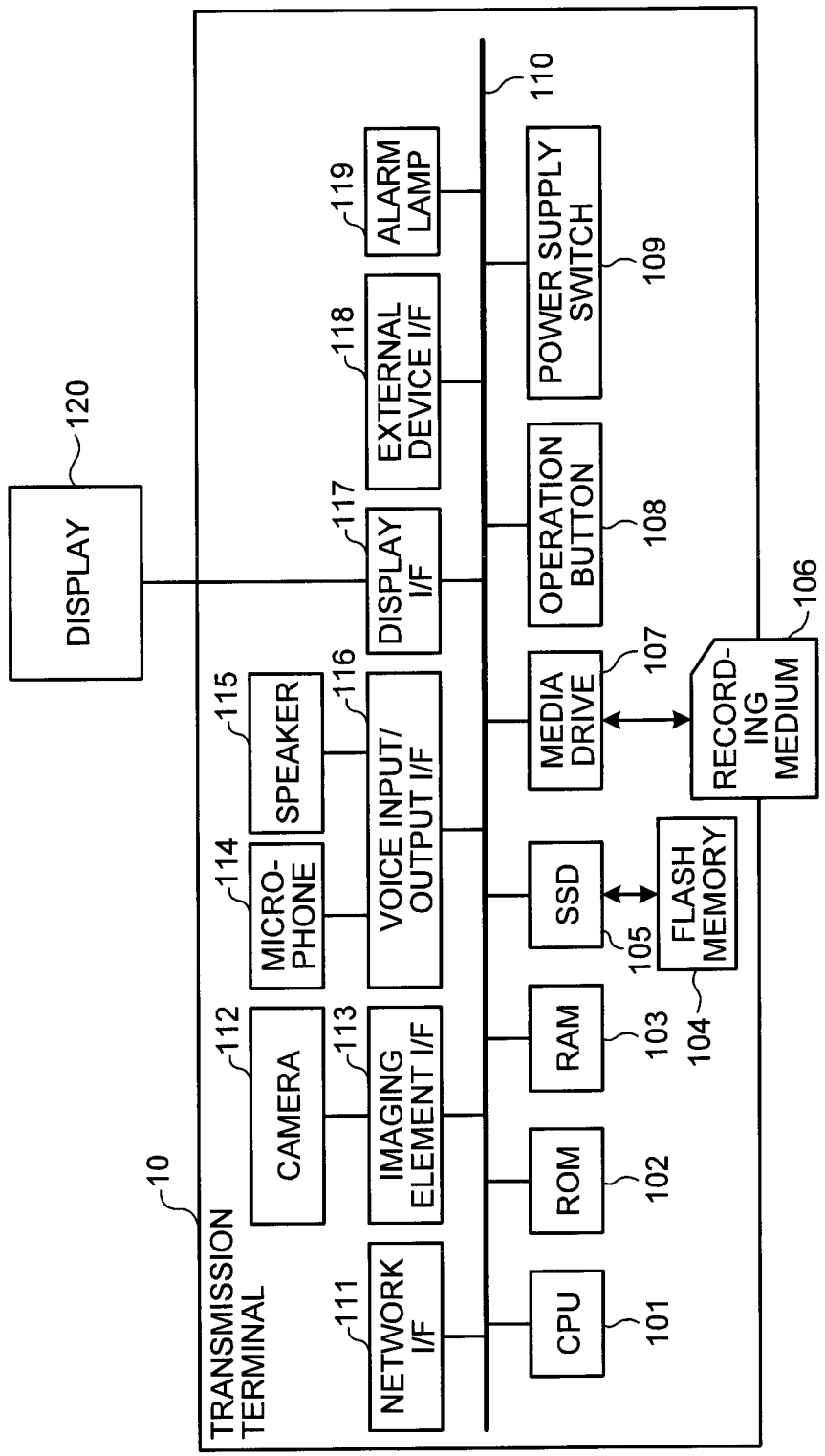
FIG. 3 is a schematic diagram illustrating a hardware configuration of the transmission terminal constituting the transmission system illustrated in FIG. 1.

FIG. 3 schematically shows a hardware configuration of the transmission terminal 10 constituting the transmission system 1 according to the present embodiment. As illustrated in FIG. 3, the transmission terminal 10 includes: a CPU (Central Processing Unit) 101 which controls the entire operation of the transmission terminal 10; a ROM (Read Only Memory) 102 that stores the program for transmission terminal; a RAM (Random Access Memory) 103 which is used as a work area for the CPU 101; a flash memory 104 that stores various types of data for example image data and/or voice data; a SSD (Solid State Drive) 105 to control reading or writing of the various types of data for the flash memory 104 according to instructions from the CPU 101; a media drive 107 that controls reading/writing (storing) of data from/to a recording medium 106, for example the flash memory; an operation button 108 operated when a destination of the terminal 10 is selected; a power supply switch 109 for turning ON/OFF of a power supply of the transmission terminal 10; a network I/F 111 for data transmission via the communication network 2 described below; a camera 1021 that obtains image data by taking an image of a subject according to instructions from the CPU 101; an image sensor element I/F 113 to control driving of the camera 1021; a built-in microphone 114 to receive a voice and audio; a built-in speaker 115 to output the voice and audio, an audio input/output I/F 116 to process input/output of an audio signal between the microphone 114 and the speaker 115 according to instructions from the CPU 101; a display I/F 117 to transmit the image data to the external display 120 according to instructions from the CPU 101; an external device I/F 118 to transmit/receive various data to/from an external device; an alarm lamp 119 to alert an error of the various functions of the transmission terminal 10; and a bus line 110, for example an address bus or a data bus, to electrically connect the above-mentioned components each other as illustrated in FIG. 3.

Note that the recording medium 106 is configured to be detachable from/to the transmission terminal 10. Not limited to the flash memory 104, as long as nonvolatile memory that performs reading/writing of data according to instructions from the CPU 101, electrically erasable and programmable ROM (EEPROM) and the like may be used. The camera 1021 includes a solid state imaging sensor that converts light into an electric charge to electronically process the image (video) of the subject. As the solid-state image sensor, a charge coupled device (CCD), the complementary metal oxide semiconductor (CMOS), and the like may be available. The display 120 is a display unit made of a liquid crystal or an organic EL, which displays an image of the subject, an operation icon, and the like.

A computer-readable recording medium, in which a program for a transmission terminal is recorded thereon with an installable or executable file format, may be distributed.

Figure 4:
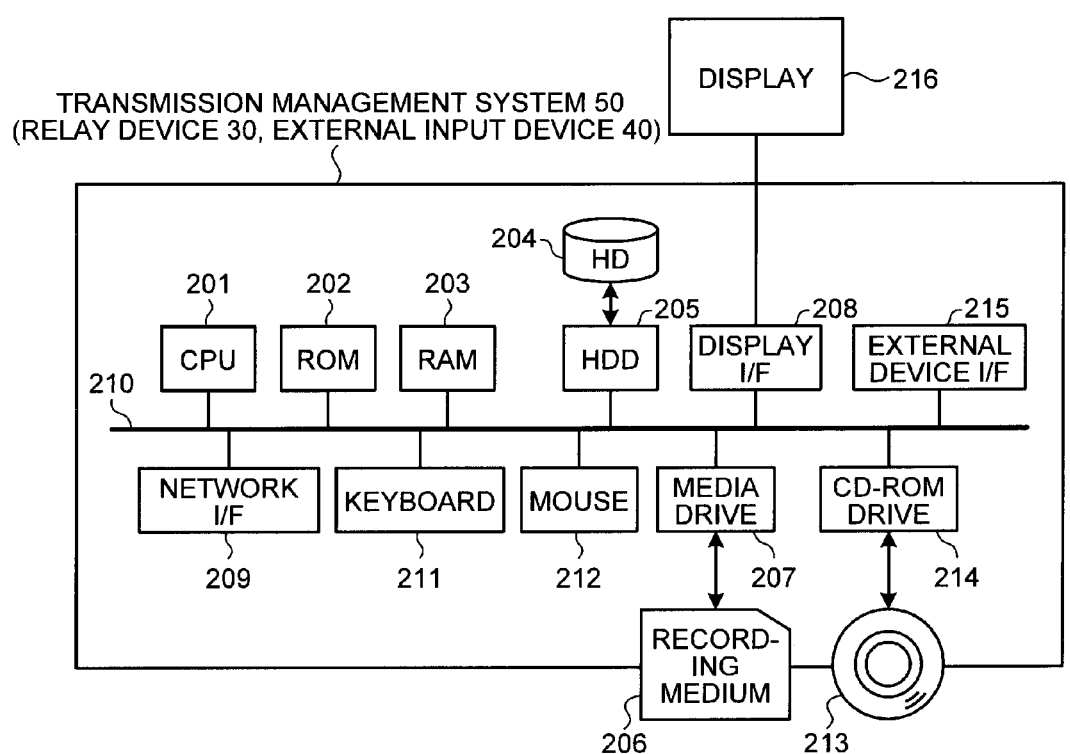
FIG. 4 is a schematic diagram illustrating a hardware configuration of a transmission management system (a relay device, an external input device, or a program providing system) constituting the transmission system illustrated in FIG. 1.

FIG. 4 shows a hardware configuration of the transmission management system 50 constituting the transmission system 1 according to the present embodiment. The transmission management system 50 includes: a CPU 201 which controls the overall operation of the transmission management system 50; a ROM 202 in which the program for transmission management is stored; a RAM 203 which is used as a work area for the CPU 201; an HD (Hard Disk) 204 in which various data is stored; an HDD (Hard Disk Drive) 205 which controls reading and writing of the various data stored in the HD 204 under the control of the CPU 201; a media drive 207 which controls reading and writing (storing) of data from/to a recording medium 206 for example flash memory; a display I/F 208 which displays various information for example a cursor, a menu, a window, a character, and an image on a display 216; a network I/F 209 which transmits data by using the communication network 2 to be described; a keyboard 211 including a plurality of keys to input a character, a number, various instructions and the like; a mouse 212 which selects and executes the various instructions, selects an object to be processed, and moves the cursor; a CD-ROM drive 214 which controls reading and writing of data from/to a CD-ROM (Compact Disc Read Only Memory) 213 that is an example of a removable recording medium; an external device I/F 215 which transmits/receives information to/from an external-device; and a bus line 210 for example an address bus or a data bus which electrically connects each of the aforementioned components. The display 216 is an example of a display device included in the external input device 40 as well.

The program for transmission management may be distributed while recorded in a recording medium for example the recording medium 206 or the CD-ROM 213 that can be read by a computer, the program having an installable Or executable file format.

The description of the hardware configuration of the external input device 40 will be omitted since the hardware configuration is similar to that of the transmission management system 50. Here, a program for external input device is stored in the ROM 202 to control the external input device 40. In this case as well, the program for external input device may be distributed while recorded in a recording medium for example the recording medium 206 or the CD-ROM 213 that can be read by a computer, the program having an installable or executable file format.

The description of the hardware configuration of the relay device 30 will be omitted since the hardware configuration is similar to that of the transmission management system 50. Here, a program for relay device is stored in the ROM 202 to control the relay device 30. In this case as well, the program for relay device may be distributed while recorded in a recording medium for example the recording medium 206 or the CD-ROM 213 that can be read by a computer, the program having an installable or executable file format.

The description of the hardware configuration of the program providing system 90 will be omitted since the hardware configuration is similar to that of the transmission management system 50. Here, a program for program providing system is stored in the ROM 202 to control the program providing system 90. In this case as well, the program for program providing system may be distributed while recorded in a recording medium for example the recording medium 206 or the CD-ROM 213 that can be read by a computer, the program having an installable or executable file format. Note that the program for program providing system may be stored in the HD 204 in place of the ROM 202.

The description of the hardware configuration of the maintenance system 100 will be omitted since the hardware configuration is similar to that of the transmission management system 50. The maintenance system 100 is a computer that performs the maintenance, management, or repair of at least one of the transmission terminal 10, the relay device 30, the transmission management system 50, and the program providing system 90. In the case where the maintenance system 100 is installed within the country while the transmission terminal 10, the relay device 30, the transmission management system 50 or the program providing system 90 is installed outside the country, for example, the maintenance system 100 is adapted to maintain at least one of the transmission terminal 10, the relay device 30, the transmission management system 50, and the program providing system 90 by performing the maintenance, management, or repair remotely via the communication network 2.

The maintenance system 100 may also perform the maintenance to manage a model number, a serial number, a customer, a maintenance check, or a trouble history of at least one of the transmission terminal 10, the relay device 30, the transmission management system 50, and the program providing system 90 without using the communication network 2.

Note that a program may also be provided while stored in another form of the removable recording medium, for example a CD-R (Compact Disc Recordable), a DVD (Digital Versatile Disk), or a Blue-ray disc that can be read by a computer.

<Functional Configuration of Embodiment>

Figure 5:
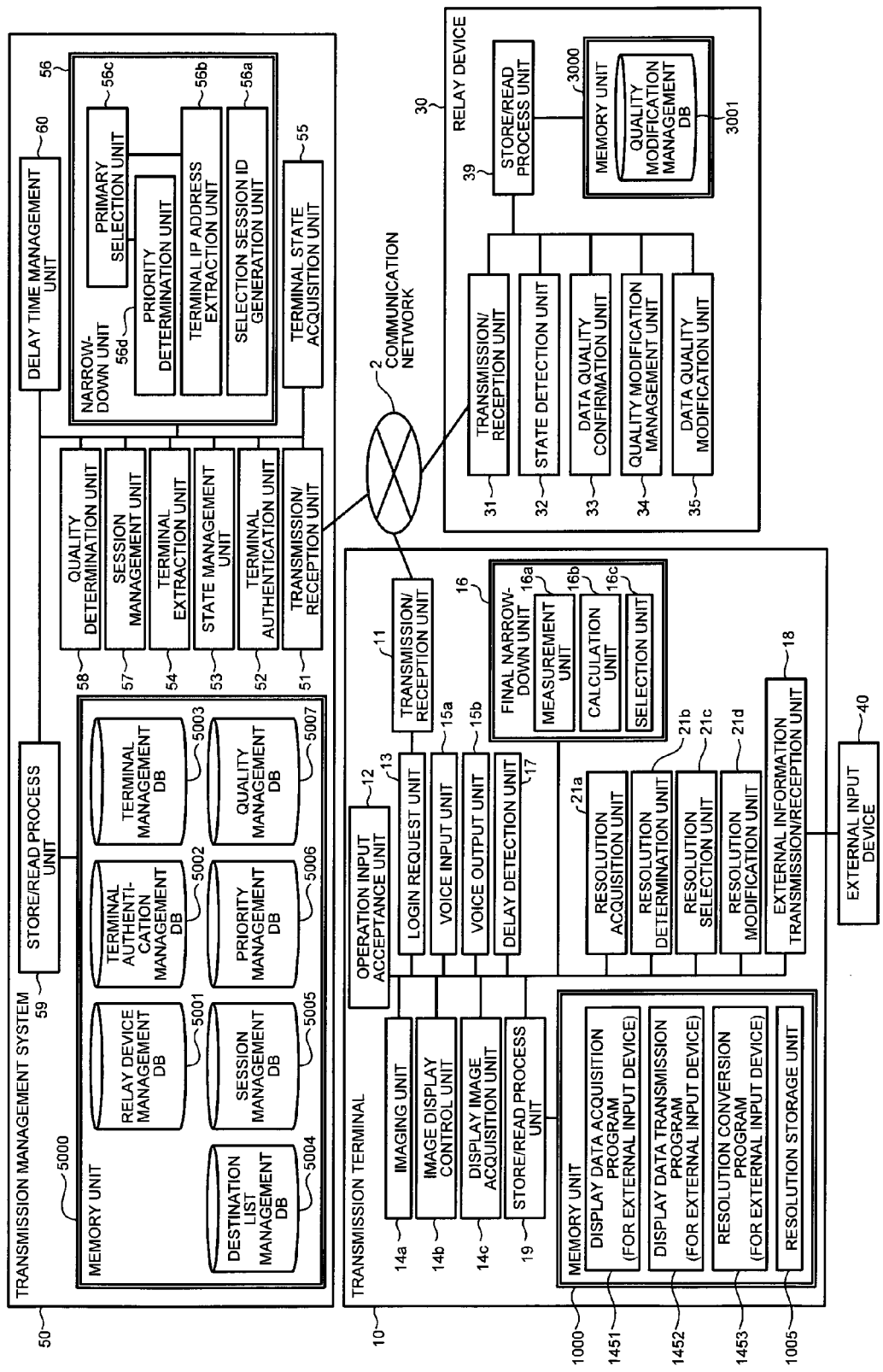
FIG. 5 is a functional block diagram of the transmission terminal, the relay device and the transmission management system that constitute the transmission system illustrated in FIG. 1.

The functional configuration of the present embodiment will be described below with reference to FIGS. 5 to 15, 24, and 25. FIG. 5 shows functions of the transmission terminal 10, the relay device 30, and the transmission management system 50 that constitute the transmission system 1 according to the present embodiment. In the example illustrated in FIG. 5, the transmission terminal 10, the relay device 30, and the transmission management system 50 are connected to be able to communicate data with each other via the communication network 2. The external input device 40 and the transmission terminal 10 are connected to be able to transmit/receive data with each other. Note that the program providing system 90 and the maintenance system 100 illustrated in FIG. 1 are not directly relevant to telephone conference communication and are omitted from FIG. 5.

Figures 24, 25:
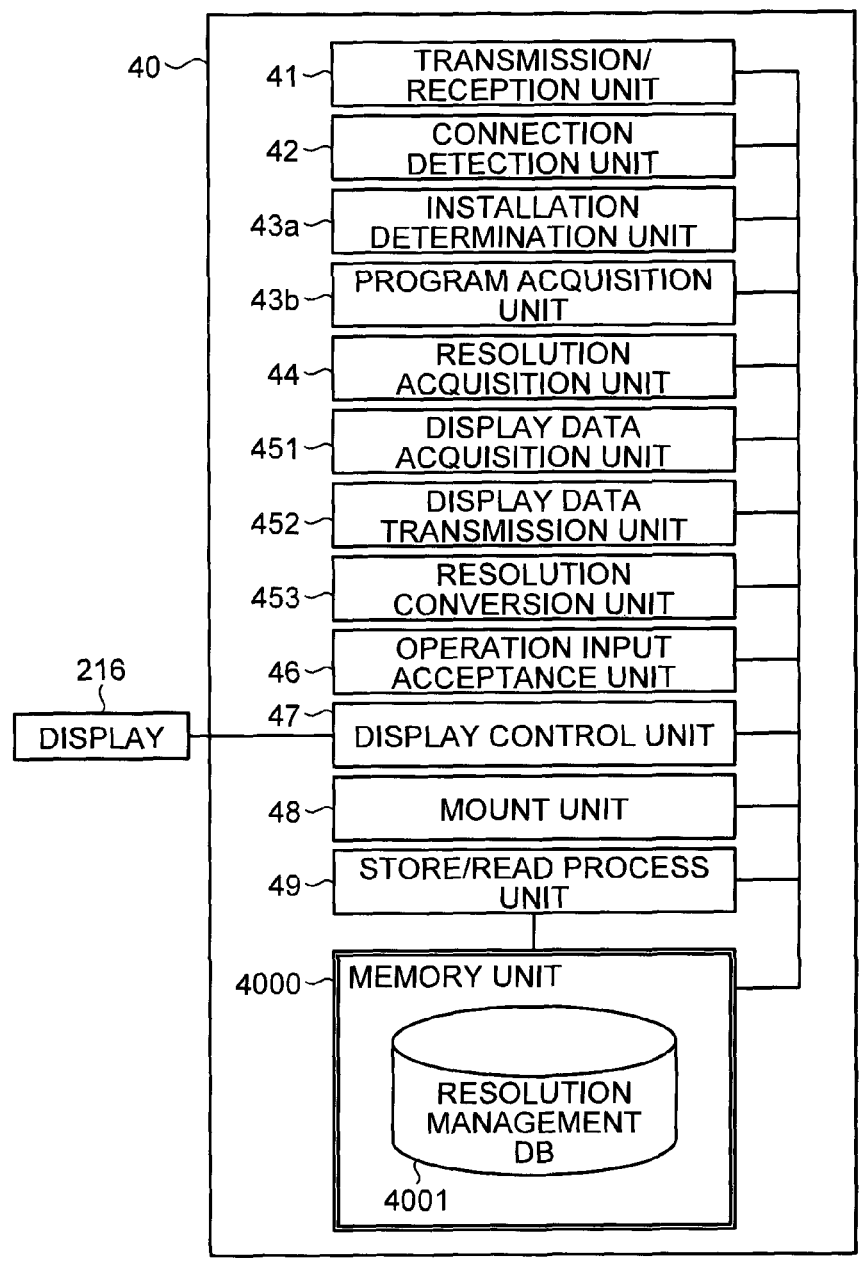
FIG. 24 is a functional block diagram of the external input device.
FIG. 25 is a table illustrating an example of a resolution management table.

FIGS. 6(a) to 6(c) show image quality of image data. FIG. 7 shows an example of a quality modification management table, FIG. 8 shows an example of a relay device management table, FIG. 9 shows an example of a terminal authentication management table, FIG. 10 shows an example of a terminal management table, FIG. 11 shows an example of a destination list management table, FIG. 12 shows an example of a session management table, FIG. 13 shows an example of an address priority management table, FIG. 14 shows an example of a transmission rate priority management table, and FIG. 15 shows an example of a quality management table. FIG. 24 shows functions of the external input device 40, and FIG. 25 shows an example of a resolution management table.

<Functional Configuration of Transmission Terminal>

As illustrated in FIG. 5, the transmission terminal 10 includes a transmission/reception unit 11, an operation input acceptance unit 12, a login request unit 13, an imaging unit 14a, an image display control unit 14b, a display image acquisition unit 14c, a voice input unit 15a, a voice output unit 15b, a final narrow-down unit 16, a delay detection unit 17, an external information transmission/reception unit 18, a store/read process unit 19, a resolution acquisition unit 21a, a resolution determination unit 21b, a resolution selection unit 21c, and a resolution modification unit 21d. Each of these functional parts is a function or means that can be implemented when any of the components illustrated in FIG. 3 is operated according to instructions from the CPU 101 by executing the program stored in the ROM 102. The transmission terminal 10 also has a memory unit 1000 including the SSD 105 illustrated in FIG. 3.

<Each Functional Part of Transmission Terminal>

Next, each functional part of the transmission terminal 10 will be described below. The transmission/reception unit 11 in the transmission terminal 10 is implemented by the network I/F 111 illustrated in FIG. 3 to transmit/receive various data to/from the other transmission terminal 10, the relay device 30, and the transmission management system 50 through the communication network 2. The operation input acceptance unit 12 is implemented by the operation button 108 and the power supply switch 109 illustrated in FIG. 3 to accept various types of input from a user. When a user turns on the power supply switch 109 (FIG. 3), for example, the operation input acceptance unit 12 (FIG. 5) accepts the power-on input and turns on a power source. The operation input acceptance unit 12 further accepts resolution information representing a resolution that is input by a user.

The login request unit 13 implemented according to instructions from the CPU 101 illustrated in FIG. 3 is triggered by the acceptance of the power-on input to automatically transmit login request information indicating a login request as well as a current IP address of the transmission terminal 10, from the transmission/reception unit 11 to the transmission management system 50 via the communication network 2.

The imaging unit 14a is implemented by the camera 1021 and the imaging element I/F 113 illustrated in FIG. 3 and generates image data representing an image of an object captured. The image display control unit 14b is implemented by the display I/F 117 illustrated in FIG. 3 and conducts a rendering process for the image data to control the image represented by the image data to be displayed on the display 120. The display image acquisition unit 14c acquires the image data representing the image displayed on the display 120. Data representing an image captured by the camera 1021 is referred to as "image data" in the present embodiment. On the other hand, data representing an image displayed on the display 216 of the external input device 40 to be described below is referred to as "display data". Note that the image data and the display data are, for example, in a JPEG (Joint Photographic Experts Group), Bitmap, or GDI (Graphics Device Interface) format.

The voice input unit 15a implemented by the microphone 114 and the voice input/output I/F 116 illustrated in FIG. 3 inputs user voice, converts the voice into a voice signal, and outputs voice data pertaining to the voice signal. The voice output unit 15b implemented by the speaker 115 and the voice input/output I/F 116 illustrated in FIG. 3 converts the voice signal pertaining to the voice data into voice and outputs the voice.

The final narrow-down unit 16 is a functional unit that performs a final narrowing process in which the plurality of relay devices 30 is narrowed down to one relay device 30 in the end. The final narrow-down unit implements a measurement unit 16a, a calculation unit 16b, and a selection unit 16c according to instructions from the CPU 101 illustrated in FIG. 3. The measurement unit 16a measures a date and time when the transmission/reception unit 11 has received pre-transmission information (to be described) every time receiving the information. The calculation unit 16b then calculates, for every pre-transmission information, the reception date and time of which is measured by the measurement unit 16a, a time required for the pre-transmission information to be received based on a difference between the measured reception time and a date and time of transmission included in the pre-transmission information. The selection unit 16c selects one relay device in the end by selecting a relay device 30 requiring the least amount of time in relaying the pre-transmission information among the required times calculated by the calculation unit 16b.

The delay detection unit 17 is implemented according to instructions from the CPU 101 illustrated in FIG. 3 and detects a delay time (ms) for the image data or the voice data transmitted from another transmission terminal 10 through the relay device 30. The external information transmission/reception unit 18 transmits/receives data to/from the external input device 40 through the external device I/F 118 illustrated in FIG. 3. The store/read process unit 19 is implemented by the SSD 105 illustrated in FIG. 3 and performs a process of storing various data in the memory unit 1000 and reading the various data stored in the memory unit 1000.

The resolution acquisition unit 21a acquires a resolution that can be displayed by the display 120 connected to the transmission terminal 10. The resolution determination unit 21b determines whether or not the resolution acquired by the resolution acquisition unit 21a includes a resolution that has an aspect ratio other than a reference aspect ratio used in transmitting the image data. Based on a result of the determination made by the resolution determination unit 21b, the resolution selection unit 21c selects the resolution having the aspect ratio other than the reference aspect ratio or a resolution having the reference aspect ratio from among the resolution that can be displayed. The resolution modification unit 21d then modifies the resolution of the display 120 to the resolution represented by resolution information accepted through the operation input acceptance unit 12. The resolution here represents the number of pixels of a display screen. The resolution includes a vertical resolution that represents the number of pixels in the vertical direction of the screen, and a horizontal resolution that represents the number of pixels in the horizontal direction of the screen.

The memory unit 1000 stores therein a terminal ID (Identification) and a password that identify the transmission terminal 10; the image data; the voice data, a relay device ID that identifies the relay device 30 transmitting various data, and an IP address of a destination terminal. A display data acquisition program 1451, a display data transmission program 1452, and a resolution conversion program 1453 are also stored in the memory unit 1000. The external input device 40 includes a display data acquisition unit 451, a display data transmission unit 452, and a resolution conversion unit 453. The aforementioned programs are transmitted and installed to the external input device 40. The display data acquisition unit 451, the display data transmission unit 452, and the resolution conversion unit 453 will be described under <Each functional part of external input device> below. The memory unit 1000 further includes a resolution storage unit 1005 in which the resolution information representing the resolution of the display data output from the transmission terminal 10 is stored.

The external information transmission/reception unit 18 is an example of resolution information transmission means and display data reception means, whereas the image display control unit 14b is an example of display control means.

The terminal ID and the relay device ID described in the present embodiment represent identification information, for example, a language, a letter, a symbol, or various signs used to uniquely identify the transmission terminal 10 and the relay device 30. The terminal ID and the relay device ID may also represent the identification information in which at least two of the language, the letter, the symbol and the various signs are combined. Note that in the description below, the transmission terminal 10 as a requestor that makes a request to start a telephone conference will be referred to as a "requestor terminal", whereas the transmission terminal 10 as a destination that receives the request will be referred to as a "destination terminal".

<Functional Configuration of External Input Device>

As illustrated in FIG. 24, the external input device 40 includes a transmission/reception unit 41, a connection detection unit 42, an installation determination unit 43a, a program acquisition unit 43b, a resolution acquisition unit 44, the display data acquisition unit 451, the display data transmission unit 452, the resolution conversion unit 453, an operation input acceptance unit 46, a display control unit 47, a mount unit 48, and a store/read process unit 49. Each of these functional parts is a function or means that is implemented when any of the components illustrated in FIG. 4 is operated according to instructions from the CPU 201 by executing the program stored in the ROM 202. The display data acquisition unit 451, the display data transmission unit 452, and the resolution conversion unit 453 are implemented when each of the display data acquisition program 1451, the display data transmission program 1452, and the resolution conversion program 1453 that is stored in the memory unit 1000 (see FIG. 5) of the transmission terminal 10 is downloaded by the program acquisition unit 43b and installed. The external input device 40 further includes a memory unit 4000 including the ROM 202, the RAM 203, or the HDD 205 illustrated in FIG. 4. Specifically not illustrated, an OS (Operating System) for example Windows (registered trademark) may be implemented in the external input device 40. Therefore, the external input device 40 functions to execute a program if the external input device 40 is connected to another device.

<Each Functional Part of External Input Device>

Each functional part of the external input device 40 will now be described below. The transmission/reception unit 41 (see FIG. 24) is implemented by the network I/F 209 illustrated in FIG. 4 and transmits/receives various data (information) to/from the transmission terminal 10. The transmission/reception unit 41 receives, as information relevant to the present invention, resolution information (first resolution information) representing a resolution that has been modified at the transmission terminal 10 side. The connection detection unit 42 detects that the various data can be transmitted/received to/from the transmission terminal 10 by means of the external device I/F 215 illustrated in FIG. 4.

Upon the connection detection unit 42 has detected that the external input device 40 can transmit/receive data to/from the transmission terminal 10, the installation determination unit 43a determines whether or not the display data acquisition program 1451, the display data transmission program 1452, and the resolution conversion program 1453 are installed in the external input device 40. When the installation determination unit 43a has determined that the display data acquisition program 1451, the display data transmission program 1452, and the resolution conversion program 1453 are not installed in the external input device 40, the program acquisition unit 43b acquires the display data acquisition program 1451, the display data transmission program 1452, and the resolution conversion program 1453 from the memory unit 1000 (see FIG. 5) of the transmission terminal 10.

The resolution acquisition unit 44 acquires resolution information (second resolution information) representing the resolution on the display 216 included in the external input device 40. The operation input acceptance unit 46 accepts information input by a user operation. The display control unit 47 displays an image read by the store/read process unit 49 to be described on the display 216. The mount unit 48 mounts the memory unit 1000 of the transmission terminal 10. As a result, the display data acquisition program 1451, the display data transmission program 1452, and the resolution conversion program 1453 can be installed in the external input device 40.

The display data acquisition unit 451 acquires display data representing an image displayed on the display 216 of the external input device 40. The display data transmission unit 452 then transmits the display data acquired by the display data acquisition unit 451 to the transmission terminal 10. The resolution conversion unit 453 converts the resolution of the display data transmitted from the external input device 40 to the transmission terminal 10, based on the resolution (the second resolution information) on the display 216 included in the external input device 40 and the resolution (the first resolution information) on the display 120 of the transmission terminal 10 that is transmitted from the transmission terminal 10 and stored in the memory unit 4000 of the external input device 40.

The store/read process unit 49 implemented by the HDD 205 illustrated in FIG. 4 performs a process of storing various data in the memory unit 4000 and reading the various data stored in the memory unit 4000.

Note that the transmission/reception unit 41 is an example of the resolution information reception means, the display data transmission unit 452 is an example of the display data transmission means, the resolution conversion unit 453 is an example of the resolution conversion means, and the display control unit 47 is an example of the display control means.

<Resolution Management Table>

The memory unit 4000 establishes a resolution management DB 4001. A resolution management table illustrated as an example in FIG. 25 is stored in the resolution management DB 4001. The resolution management table stores information representing the resolution in the vertical direction (height direction) of the display 120 and information representing the resolution in the horizontal direction (width direction) of the display 120, at the transmission terminal 10 received by the transmission/reception unit 41, so that both information are associated with each other. In the resolution management table illustrated in FIG. 25, for example, the display 120 of the transmission terminal 10 has the resolution (width) of 1024 pixels and the resolution (height) of 768 pixels.

<Functional Configuration of Relay Device>

The function (or means) of the relay device 30 will now be described. As illustrated in FIG. 5, the relay device 30 includes a transmission/reception unit 31, a state detection unit 32, a data quality confirmation unit 33, a quality modification management unit 34, a data quality modification unit 35, and a store/read process unit 39. Each of these functional parts is a function or means to be implemented when any of the components illustrated in FIG. 4 is operated according to instructions from the CPU 201 by executing the program stored in the ROM 202. The relay device 30 further includes a memory unit 3000 including any of the ROM 202, the RAM 203, and the HDD 205 illustrated in FIG. 4.

<Quality Modification Management Table>

The memory unit 3000 includes a quality modification management DB 3001 including a quality modification management table as illustrated in FIG. 7. An IP address of the transmission terminal 10 to which the image data is relayed and the image quality of the image data relayed to the transmission terminal by the relay device 30 are managed in association with each other in the quality modification management table.

Now, the image resolution of the image data managed in the transmission system 1 of the present embodiment will be described. Referring to FIGS. 6(a) to 6(c), the image data includes: a low resolution image to be a base image having 160 pixels in the horizontal direction and 120 pixels in the vertical direction as illustrated in FIG. 6(a); a medium resolution image having 320 pixels in the horizontal direction and 240 pixels in the vertical direction as illustrated in FIG. 6(b); and a high resolution image having 640 pixels in the horizontal direction and 480 pixels in the vertical direction as illustrated in FIG. 6(c). When data is communicated via a narrowband channel, low-quality image data formed solely of image data to be a base image having a low resolution is relayed. Medium-quality image data is relayed when data is communicated using a relatively wide band, the medium-quality image data being formed of the image data to be the base image having the low resolution and image data having a medium resolution. Furthermore, high-quality image data is relayed when data is communicated using a very wide band, the high-quality image data being formed of the image data to be the base image having the low resolution, the image data having the medium resolution, and image data having a high resolution. Referring to the quality modification management table illustrated in FIG. 7, for example, the image quality (the quality of image) of the image data relayed by the relay device 30 to the destination terminal 10db (see FIG. 1) with an IP address "1.3.2.4" is "high quality".

<Each Functional Part of Relay Device>

Each functional part of the relay device 30 will now be described below. Note that in the description below, each functional part of the relay device 30 will be described in association with a main component among the respective components illustrated in FIG. 4 that serves to implement each functional part of the relay device 30.

The transmission/reception unit 31 (see FIG. 5) of the relay device 30 is implemented by the network I/F 209 illustrated in FIG. 4 and performs transmission/reception of various data among the other transmission terminal 10, the relay device 30, and the transmission management system 50 through the communication network 2. The state detection unit 32 is implemented according to instructions from the CPU 201 illustrated in FIG. 4 and detects an operation state of the relay device 30 in which the state detection unit 32 is included. The operation state can be "ON line", "OFF line", or "out of order".

The data quality confirmation unit 33 is implemented according to instructions from the CPU 201 illustrated in FIG. 4 and confirms the image quality of the image data to be relayed by searching the quality modification management table (see FIG. 7) by means of the IP address of the destination terminal 10 as a search key and extracting the image quality of the image data to be relayed corresponding to the IP address. The quality modification management unit 34 is implemented according to instructions from the CPU 201 illustrated in FIG. 4 and modifies the content in the quality modification management DB 3001 based on quality information to be described that is transmitted from the transmission management system 50. For example, the relay device 30 is required to lower the image quality of the image data that has been relayed from high image quality to medium image quality when the destination terminal 10db experiences a delay in receiving the image data due to a telephone conference started between a requestor terminal 10bb and a destination terminal 10ca via the communication network 2 in the middle of a telephone conference held between the requestor terminal 10aa with the terminal ID "01aa" and the destination terminal 10db with the terminal ID "01db" transmitting/receiving high-quality image data. In this case, the content in the quality modification management DB 3001 is modified based on the quality information indicating medium image quality such that the image quality of the image data relayed by the relay device 30 is lowered from high to medium image quality.

The data quality modification unit 35 is implemented according to instructions from the CPU 201 illustrated in FIG. 4 and modifies the image quality of the image data, transmitted from the requestor terminal 10 based on the content in the quality modification management DB 3001 that has been modified. The store/read process unit 39 is implemented by the HDD 205 illustrated in FIG. 4 and performs a process of storing various data in the memory unit 3000 and reading the various data stored in the memory unit 3000.

<Functional Configuration of Transmission Management System>

The function (or means) of the transmission management system 50 will now be described. As illustrated in FIG. 5, the transmission management system 50 includes a transmission/reception unit 51, a terminal authentication unit 52, a state management unit 53, a terminal extraction unit 54, a terminal state acquisition unit 55, a narrow-down unit 56, a session management unit 57, a quality determination unit 58, a store/read process unit 59, and a delay time management unit 60. Each of these functional parts is a function or means to be implemented when any of the components illustrated in FIG. 4 is operated according to instructions from the CPU 201 in accordance with the program stored in the ROM 202. The transmission management system 50 further includes a memory unit 5000 including the ROM 202, the RAM 203, or the HDD 205 illustrated in FIG. 4.

<Relay Device Management Table>

The memory unit 5000 includes a relay device management DB 5001 including a relay device management table as illustrated in FIG. 8. For each relay device ID of each relay device 30, the relay device management table includes an operation state of each relay device 30, a date and time when the transmission management system 50 receives state information indicating the operation state, an IP address of the relay device 30, and a maximum data transmission rate (Mbps) of the relay device 30 that are all managed to be associated with each other. For example, the relay device management table in FIG. 8 illustrates that, regarding the relay device 30a (see FIG. 1) with a relay device ID of "111a", the relay device 30a is "ON line", the transmission management system 50 has received the state information in "Nov. 10, 2009 at 13:00", the IP address of the relay device 30a is "1.2.1.2", and the maximum data transmission rate of the relay device 30a is 100 Mbps.

<Terminal Authentication Management Table>

The memory unit 5000 further includes a terminal authentication management DB 5002 including a terminal authentication management table as illustrated in FIG. 9. The terminal authentication management table includes a terminal ID and a password corresponding thereto for each of the transmission terminals 10 managed by the transmission management system 50. For example, the terminal authentication management table in FIG. 9 illustrates that the transmission terminal 10aa (see FIG. 1) has a terminal ID "01aa" and a password "aaaa".

<Terminal Management Table>

The memory unit 5000 further includes a terminal management DB 5003 including a terminal management table as illustrated in FIG. 10. For each terminal ID of each transmission terminal 10, the terminal management table includes an operation state of the transmission terminal 10, a date and time when the transmission management system 50 has received login request information, and an IP address of the transmission terminal 10 that are all managed to be associated with each other. For example, the terminal management table in FIG. 10 illustrates that, regarding the transmission terminal 10aa (see FIG. 1) with the terminal ID of "01aa", the operation state of the transmission terminal 10aa is "ON line", the transmission management system 50 has received the login request information in "Nov. 10, 2009 at 13:40", and the IP address of the transmission terminal 10aa is "1.2.1.3".

<Destination List Management Table>

The memory unit 5000 further establishes a destination list management DB 5004 including a destination list management table as illustrated in FIG. 11. In the destination list management table, a terminal ID of the requestor terminal 10 requesting to start a telephone conference and all corresponding terminal ID(s) of the destination terminal 10 registered as a candidate destination terminal 10 are managed to be associated with each other. In the destination list management table illustrated in FIG. 11, for example, the requestor terminal 10aa (see FIG. 1) with the terminal ID "01aa" can make a request to start a telephone conference to three candidate destination terminals 10 including the transmission terminal 10ab with a terminal ID "01ab", the transmission terminal 10ba with a terminal ID "01ba", and the transmission terminal 10db with a terminal ID "01db". The candidate destination terminal 10 is updated by adding or deleting a candidate when the requestor terminal 10 makes a request to the transmission management system 50 to add or delete a candidate.

<Session Management Table>

The memory unit 5000 further establishes a session management DB 5005 including a session management table as illustrated in FIG. 12. For every selection session ID used in executing a session to select the relay device 30, the session management table includes a relay device ID of the relay device 30, a terminal ID of the requestor terminal 10, a terminal ID of the destination terminal 10, a delay time (ms), and a reception date and time that are all managed to be associated with each other. Here, "the delay time (ms)" refers to a receiving delay time when the image data is received by the destination terminal 10, "the reception date and time" refers to a date and time when the transmission management system 50 has received delay information indicating the delay time from the destination terminal 10.

For example, the session management table in FIG. 12 illustrates that the relay device 30a (with the relay device ID "111a") selected in a session executed by using a selection session ID "se1" relays the image data and the voice data between the requestor terminal 10aa (see FIG. 1) with the terminal ID "01aa" and the destination terminal 10db with the terminal ID "01db". The delay time for the image data to be received by the destination terminal 10db is 200 (ms) as of "Nov. 10, 2009 at 14:00".

Note that when a telephone conference is held between two transmission terminals 10, the reception date and time of the delay information may be managed based on the delay information transmitted from not the destination terminal 10 but the requestor terminal 10. However, the reception date and time of the delay information is managed based on the delay information transmitted from the transmission terminal 10 which receives the image data and the voice data, when a telephone conference is held among three or more transmission terminals 10.

<Address Priority Management Table>

The memory unit 5000 further establishes a priority management DB 5006 including an address priority management table as illustrated in FIG. 13. The address priority management table manages a dot address portion including a set of four numbers from an IP address of a typical IPv4 associated with an address priority point such that the higher the identity of the dot address portion of the set of four numbers from the IP address, the higher the address priority point. In the address priority management table illustrated in FIG. 13, for example, an IP address having three identical values from a higher to a lower order in the dot address has the address priority point of "5". An IP address having two identical values from the higher to the lower order in the dot address has the address priority point of "3". In this case, a lowest order value in the dot address is irrelevant to determining the priority. An IP address having a highest order value that is identical and a second highest order value that is different in the dot address has the address priority point of "1". In this case, values in a third highest order and the lowest order in the dot address are irrelevant to determining the priority. An IP address having a different highest order value in the dot address has the address priority point of "0". In this case, values in the second and third highest orders and the lowest order in the dot address are irrelevant to determining the priority.

<Transmission Rate Priority Management Table>

The priority management DB 5006 established in the memory unit 5000 further includes a transmission rate priority management table as illustrated in FIG. 14. In the transmission rate priority management table, a value of the maximum data transmission rate (Mbps) of the relay device 30 is managed to be associated with a transmission rate priority point such that the faster the transmission rate, the higher the priority point. For example, in the transmission rate priority management table illustrated in FIG. 14, the relay device 30 having the maximum data transmission rate of 1000 Mbps or greater has the transmission rate priority point of "5". The relay device 30 having the maximum data transmission rate of 100 Mbps or greater and less than 1000 Mbps has the transmission rate priority point of "3". The relay device 30 having the maximum data transmission rate of 10 Mbps or greater and less than 100 Mbps has the transmission rate priority point of "1". The relay device 30 having the maximum data transmission rate of less than 10 Mbps has the transmission rate priority point of "0".

<Quality Management Table>

The memory unit 5000 further establishes a quality management DB 5007 including a quality management table as illustrated in FIG. 15. In the quality management table, the image quality of the image data relayed by the relay device 30 is managed in association with the delay time (ms) generated when the image data is transmitted/received by the requestor terminal 10 or the destination terminal 10.

<Each Functional Part of Transmission Management System>

Now, each functional part of the transmission management system 50 will be described below. Note that each functional part of the transmission management system 50 will be described associated with a main component among the respective components illustrated in FIG. 5 that serves to implement each functional part of the transmission management system 50.

The transmission/reception unit 51 (see FIG. 5) is implemented by the network I/F 209 illustrated in FIG. 4 and transmits/receives various data to/from the transmission terminal 10, the relay device 30, or the other systems 90 and 100 via the communication network 2. The terminal authentication unit 52 searches the terminal authentication management DB 5002 of the memory unit 5000 by using a search key that consists of the terminal ID and the password included in the login request information received through the transmission/reception unit 51, and performs terminal authentication by determining whether the terminal ID and the password identical to those in the login request information are managed in the terminal authentication management DB 5002. In order to manage the operation-state of the requestor terminal 10 making a login request, the state management unit 53 stores the terminal ID of the requestor terminal 10, the operation state of the requestor terminal 10, the date and time when the transmission management system 50 has received the login request information, and the IP address of the requestor terminal 10 associated with each other in the terminal management table (FIG. 10).

The terminal extraction unit 54 searches the destination list management table (FIG. 11) by using a key that consists of the terminal ID of the requestor terminal 10 having made the login request, and extracts the terminal ID by reading the terminal ID of the candidate destination terminal 10 that can communicate with the requestor terminal 10. The terminal extraction unit 54 also searches the destination list management table (FIG. 11) by using the key that is the terminal ID of the requestor terminal 10 having made the login request, and extracts the terminal ID of another requestor terminal 10 which has registered the terminal ID of the aforementioned requestor terminal 10 as the candidate destination terminal 10.

The terminal state acquisition unit 55 searches the terminal management table (FIG. 10) by using a search key that consists of the terminal ID of the candidate destination terminal 10 extracted by the terminal extraction unit 54, and reads the operation state of each terminal ID extracted by the terminal extraction unit 54. As a result, the terminal state acquisition unit 55 can acquire the operation state of the candidate destination terminal 10 that can communicate with the requestor terminal 10 having made the login request. The terminal state acquisition unit 55 further searches the terminal management table (FIG. 10) by using the search key that consists of the terminal ID extracted by the terminal extraction unit 54, and acquires the operation state of the requestor terminal 10 having made the login request.

The narrow-down unit 56 includes a selection session ID generation unit 56a, a terminal IP address extraction unit 56b, a primary selection unit 56c, and a priority determination unit 56d. The narrow-down unit 56 thereby performs a primary narrow-down process prior to a final narrow-down process in order to assist the final narrow-down process in which the plurality of relay devices 30 is narrowed down to one relay device 30 in the end. More particularly, the selection session ID generation unit 56a generates a selection session ID used to execute the session that selects the relay device 30. The terminal IP address extraction unit 56b extracts the IP address of the corresponding transmission terminal 10 by searching the terminal management table (FIG. 10) based on the terminal ID of the requestor terminal 10 and the terminal ID of the destination terminal 10 that are included in start request information transmitted from the requestor terminal 10. The primary selection unit 56c selects the relay device 30 by selecting the relay device ID of the relay device 30 which is "ON line" from among the relay devices 30 managed in the relay device management table (FIG. 8).

Based on the IP address of the requestor terminal 10 and the IP address of the destination terminal 10 that are extracted by the terminal IP address extraction unit 56b, the primary selection unit 56c further searches the relay device management table (FIG. 8) to examine whether the dot address of each of the IP addresses of the requestor terminal 10 and the destination terminal 10 is identical or different to/from each dot address of the IP address of the relay device 30 that has been selected. The primary selection unit 56c further narrows down the relay device 30 by selecting the top two relay devices 30 that have two highest overall points. The overall point is obtained for each relay device and includes the higher of the address priority points between the transmission terminals 10, combined with the transmission rate priority point of the relay device.

While the top two relay devices 30 having the two highest points are selected in the present embodiment, top three or more relay devices 30 having the highest points may be selected instead, as long as the narrow-down part can narrow down as many relay devices. 30 as possible.

The priority determination unit 56d refers to the priority management table (see FIG. 13) to determine the address priority point for each relay device 30 examined by the primary selection unit 56c. Based on the maximum data transmission rate of each relay device 30 managed in the relay device management table (see FIG. 8), the priority determination unit 56d further searches the priority management table (see FIG. 14) to determine the transmission rate priority point for each relay device 30 narrowed down by the primary selection unit 56c.

The session management unit 57 stores the selection session ID generated by the selection session ID generation unit 56a, the terminal ID of the requestor terminal, and the terminal ID of the destination terminal so that they are associated with each other, into the session management DB 5005 (the session management table in FIG. 12) included in the memory unit 5000. The session management unit 57 further stores and manages, for each selection session ID, the relay device ID of the one relay device 30 that is selected in the end by the selection unit 16c of the transmission terminal 10 in the session management table (FIG. 12).

The quality determination unit 58 searches the quality management table (FIG. 15) by using the delay time as the search key and determines the image quality of the image data to be relayed by the relay device 30 by extracting the image quality of the corresponding image data. The store/read process unit 59 is implemented by the HDD 205 illustrated in FIG. 4 and performs the process of storing various data into the memory unit 5000 and reading the various data stored in the memory unit 5000. The delay time management unit 60 searches the terminal management table (FIG. 10) by using the IP address of the destination terminal 10 as the search key and extracts the corresponding terminal ID. The delay time management unit further stores the delay time indicated by the delay information into a field corresponding to the delay time in a record that includes the extracted terminal ID in the session management table (FIG. 12).

<Process and Operation of Embodiment>

Figure 18:
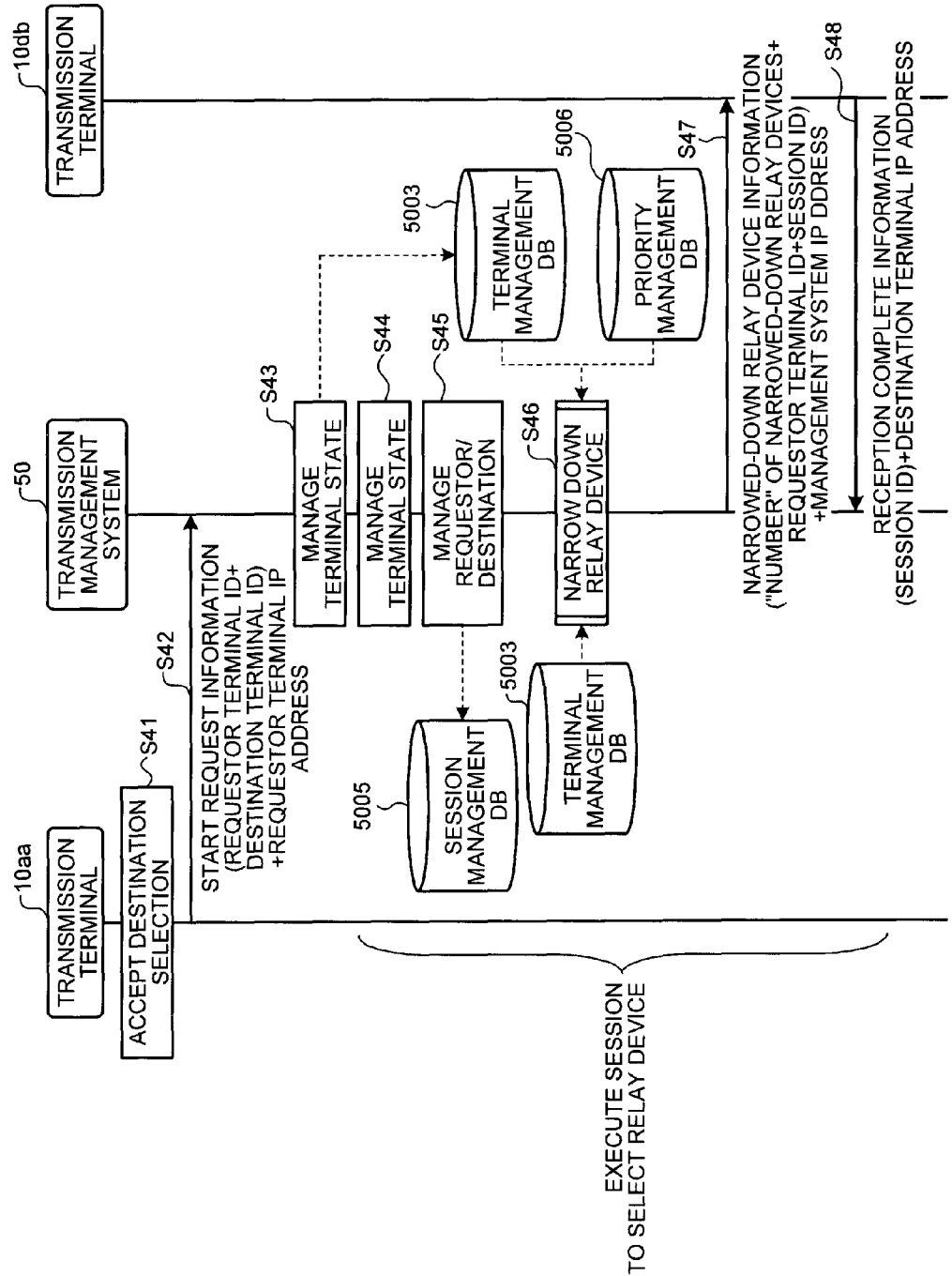
FIG. 18 is a sequence diagram illustrating an example of a process in which the transmission management system selects a relay device to be used.
Figure 19:
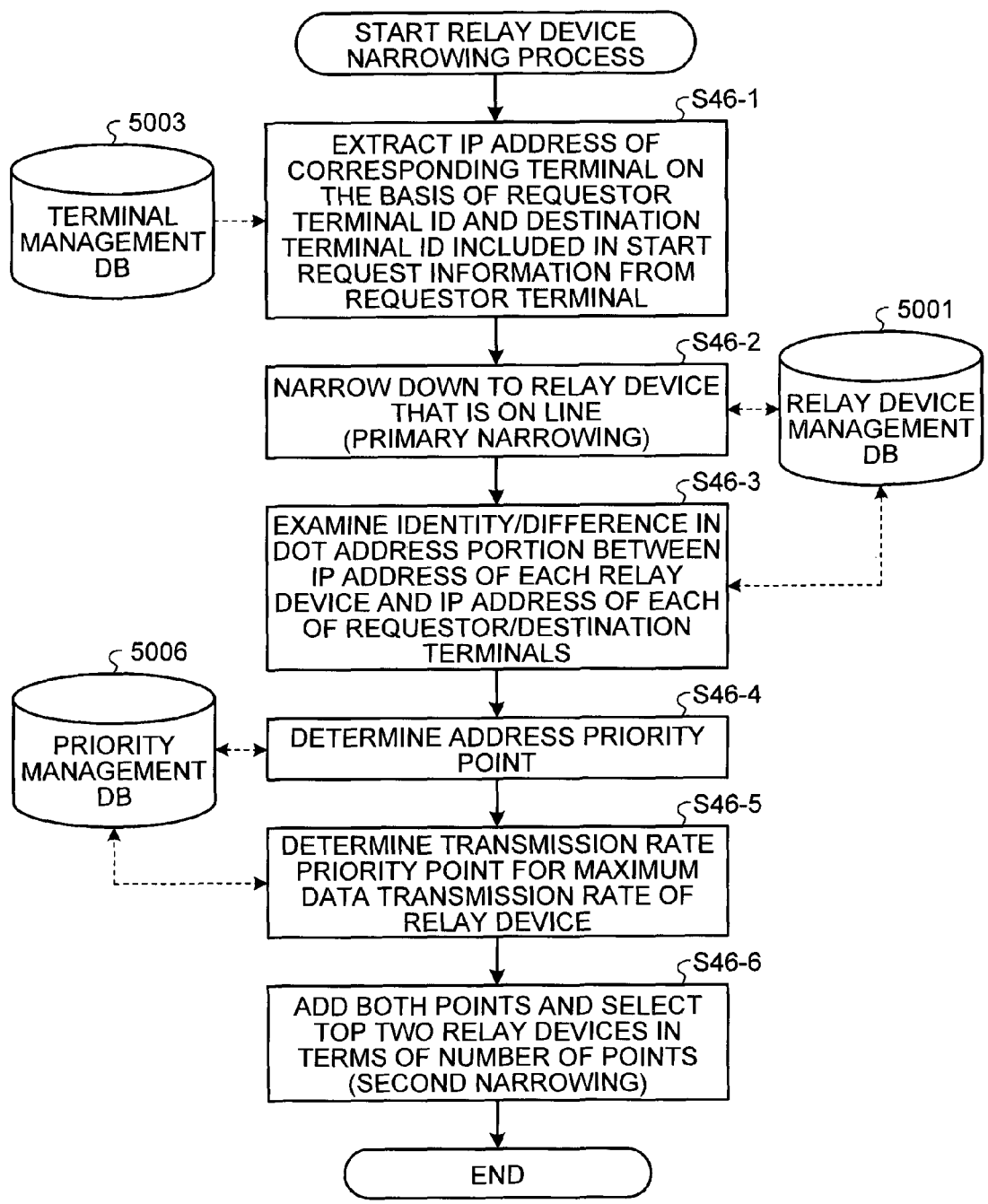
FIG. 19 is a flow chart illustrating an example of the process to select a relay device to be used.
Figure 21:
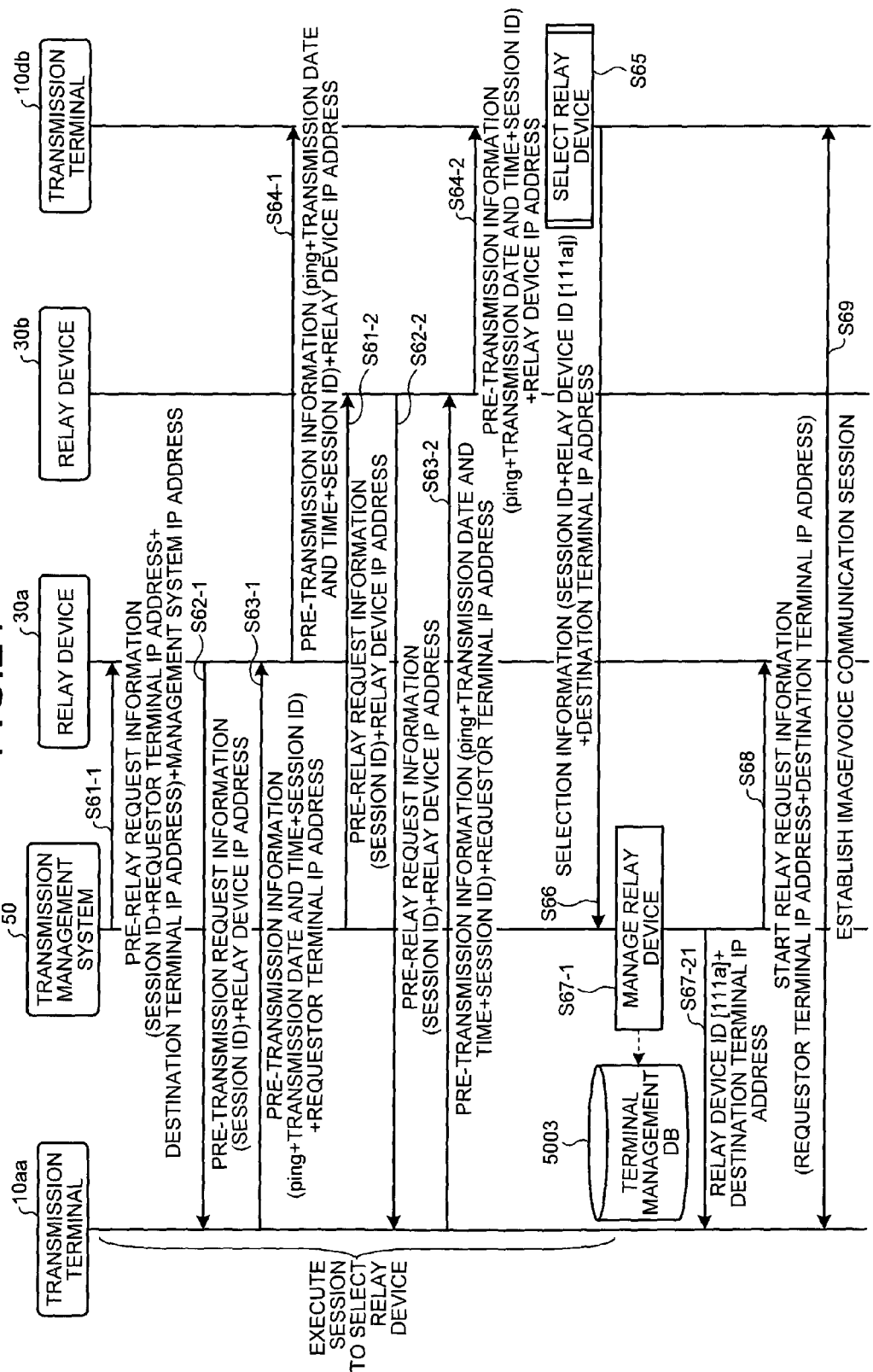
FIG. 21 is a sequence diagram illustrating an example of a process in which the transmission terminal selects a relay device to be used.
Figure 22:
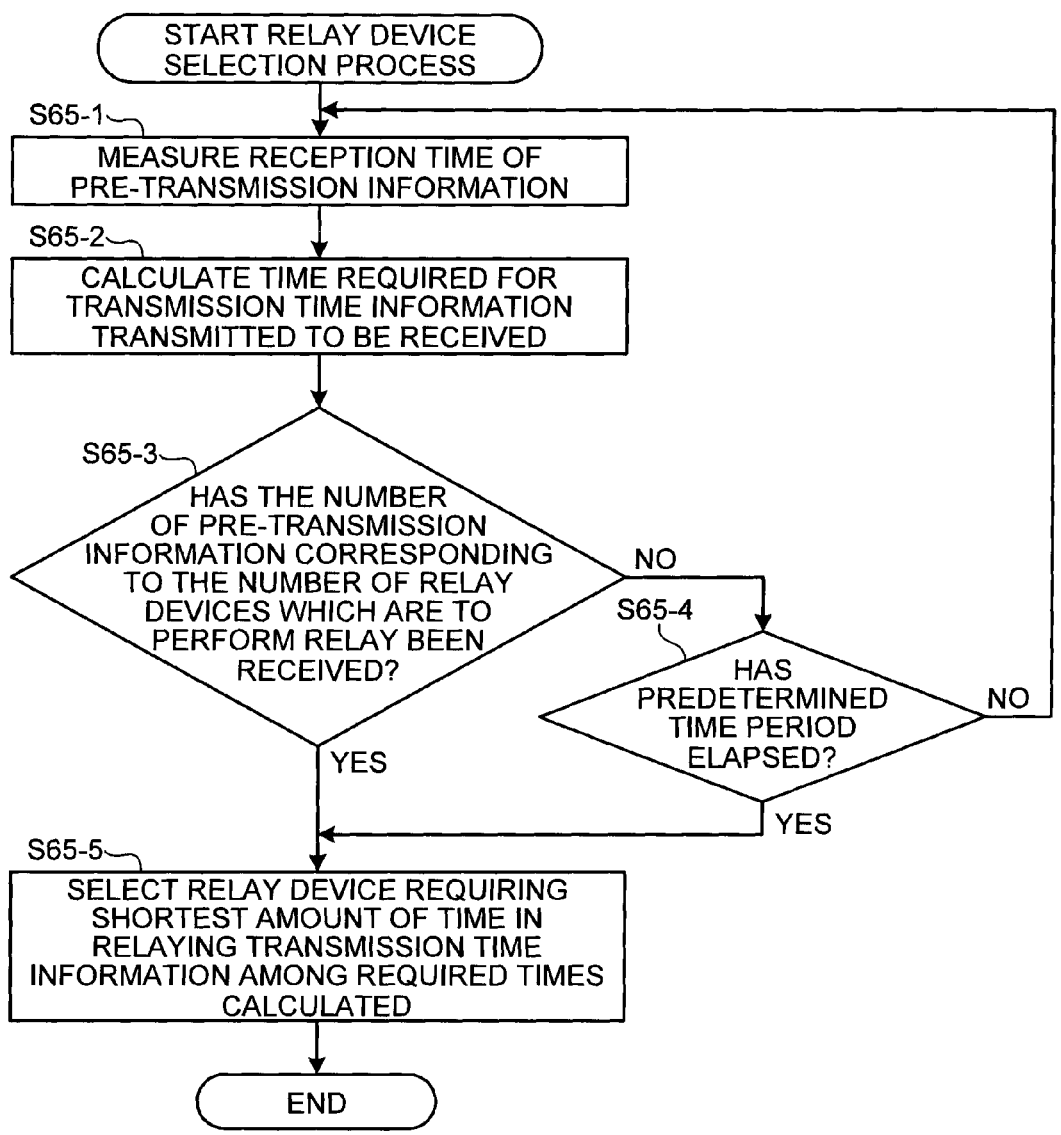
FIG. 22 is a flow chart illustrating an example of the process of selecting a relay device.
Figure 23:
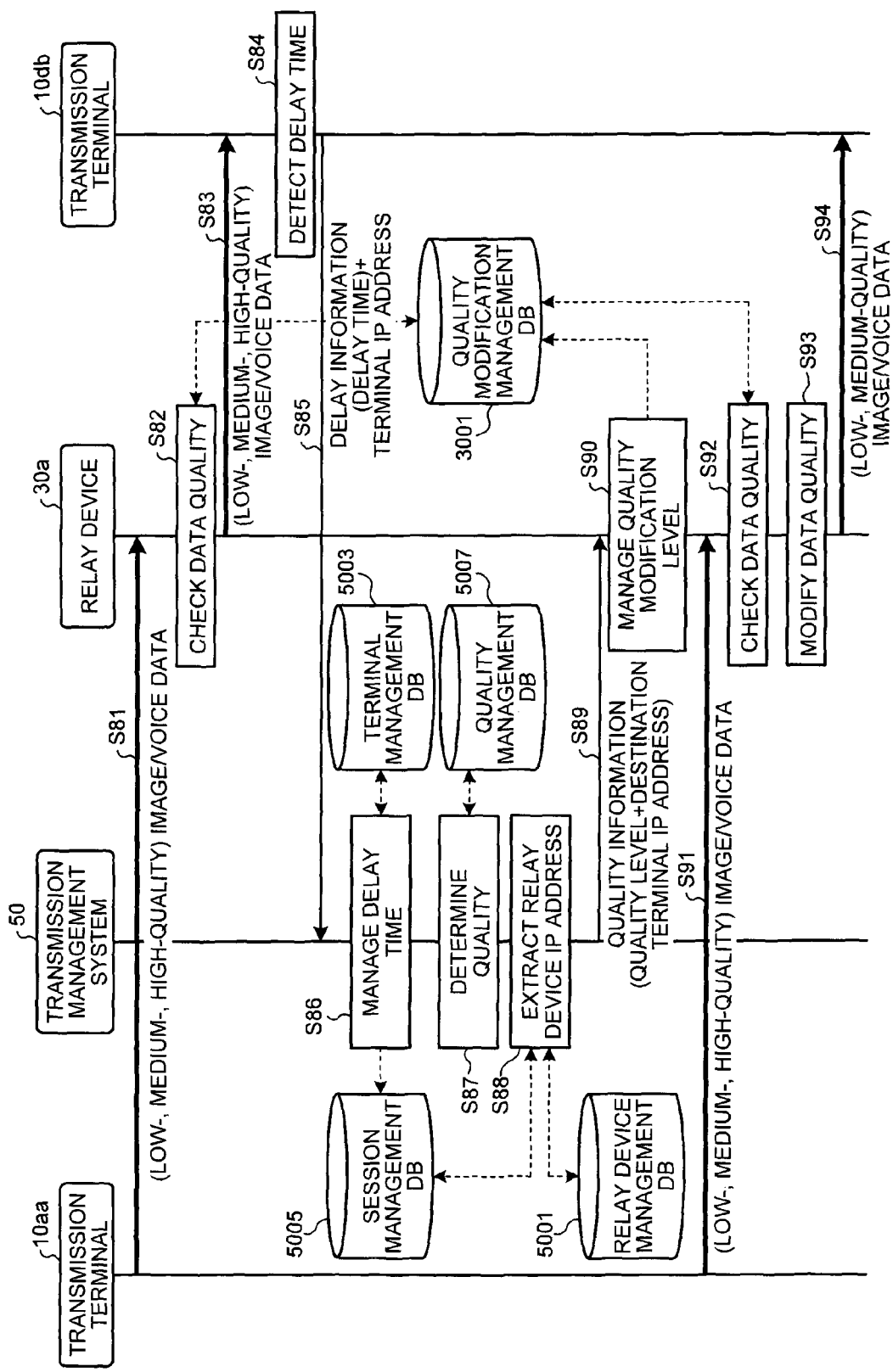
FIG. 23 is a sequence diagram illustrating an example of a process in which image data and voice data are transmitted/received to/from transmission terminals.

Various processes and operations performed in the transmission system 1 of the present embodiment will now be described with reference to FIGS. 16 to 23 and 26 to 33. FIG. 16 shows an example of a process that manages state information transmitted from each relay device 30 to the transmission management system 50 and representing the operation state of each relay device 30. FIG. 17 shows an example of a process performed in a preparatory phase before communication is established among each transmission terminal 10. FIG. 18 shows an example of a process in which the transmission management system 50 narrows down the relay device 30 to be used. FIG. 19 shows a exemplary flow chart of the process that narrows down the relay device 30 to be used. FIG. 20 shows a exemplary table of a priority point calculated for the transmission management system 50 to perform the process of narrowing down the relay device 30 to be used. FIG. 21 shows an example of a process in which the relay device 30 is selected by the transmission terminal 10. FIG. 22 shows a exemplary flow chart of the process of selecting the relay device 30. FIG. 23 shows an example of a process in which the image data and the voice data are transmitted and received among the transmission terminals 10.

Figure 26:
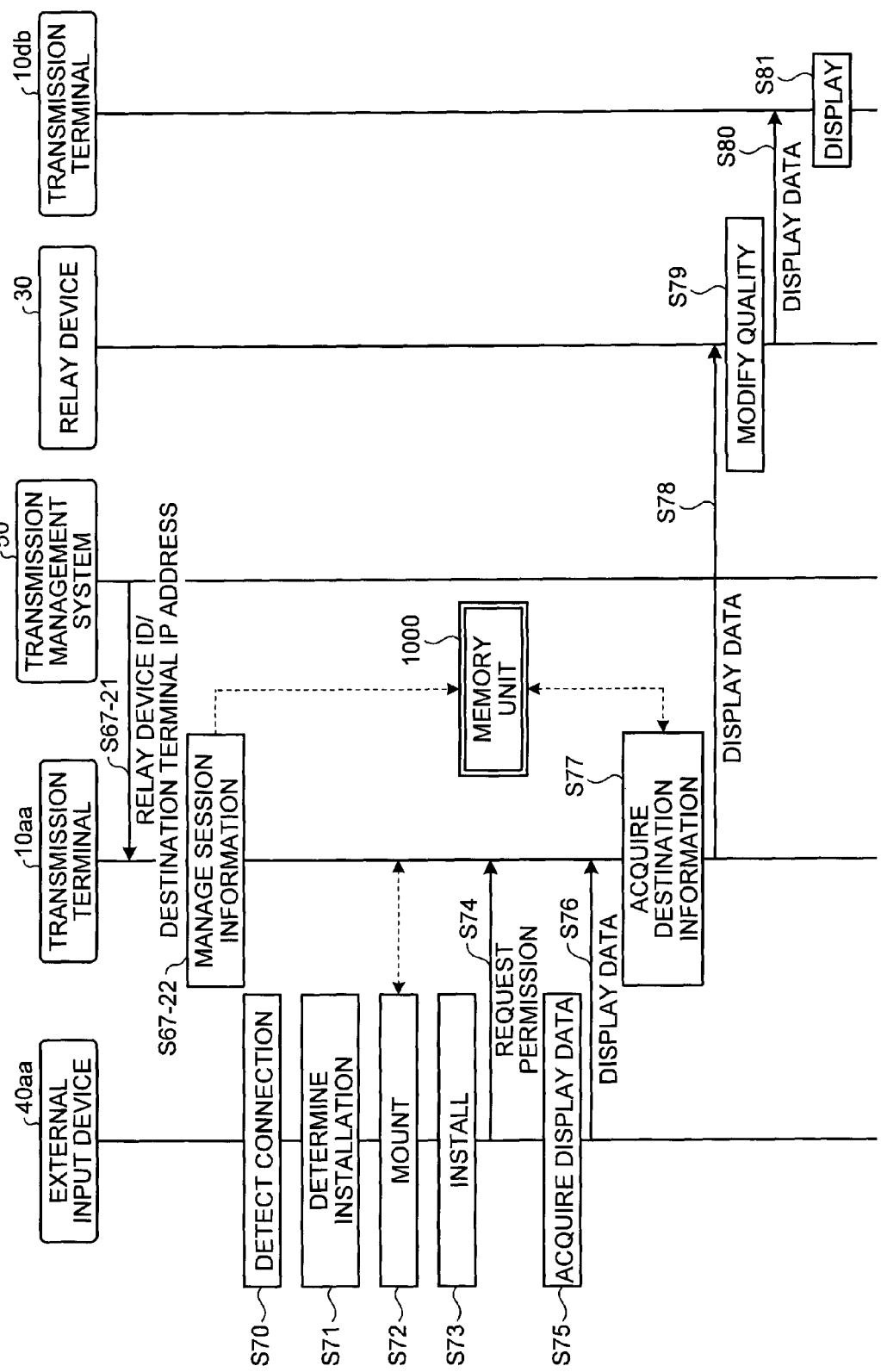
FIG. 26 is a sequence diagram illustrating an example of a process in which an image displayed in the external input device is displayed in the transmission terminal of the other one who attends the conference.
Figure 27:
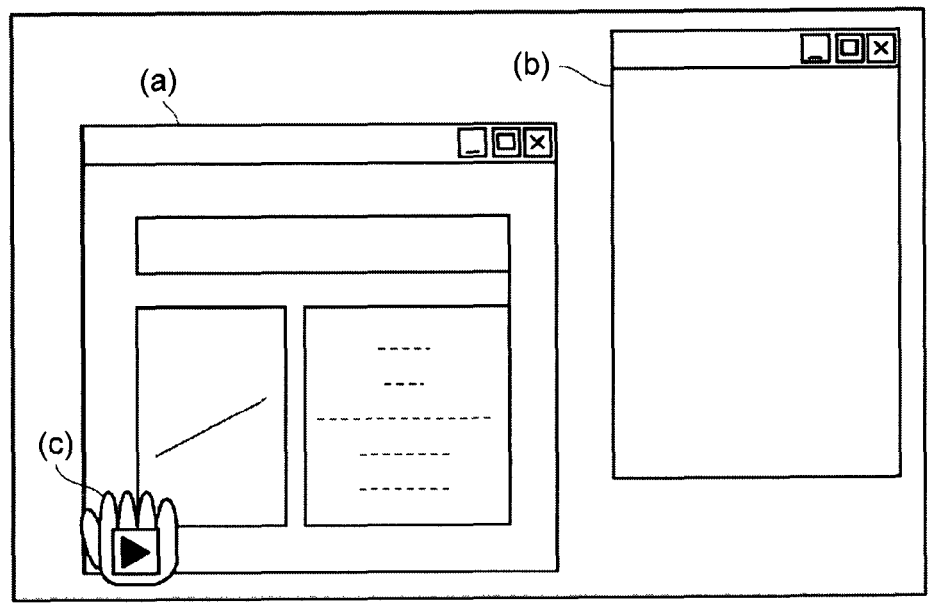
FIG. 27 is a diagram illustrating an example of a screen including an image displayed by the external input device.
Figure 28:
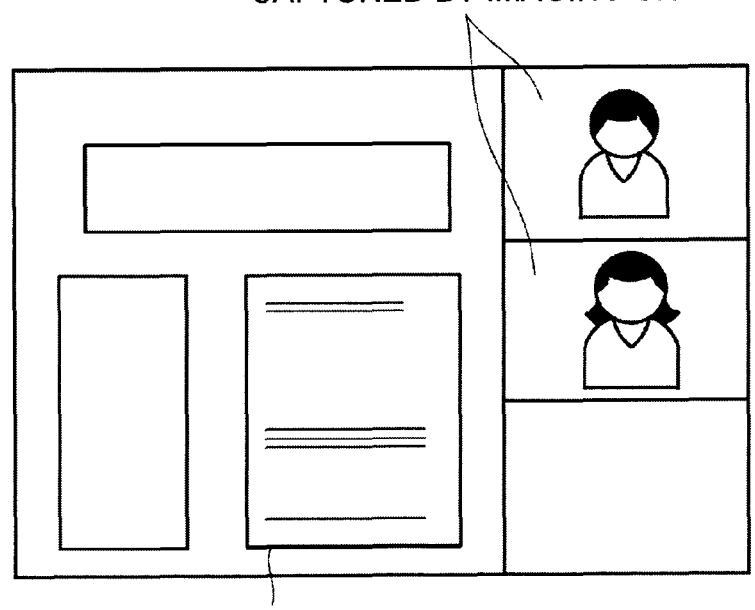
FIG. 28 is a diagram illustrating an example of a screen on which the images are displayed by the transmission terminal.
Figure 29:
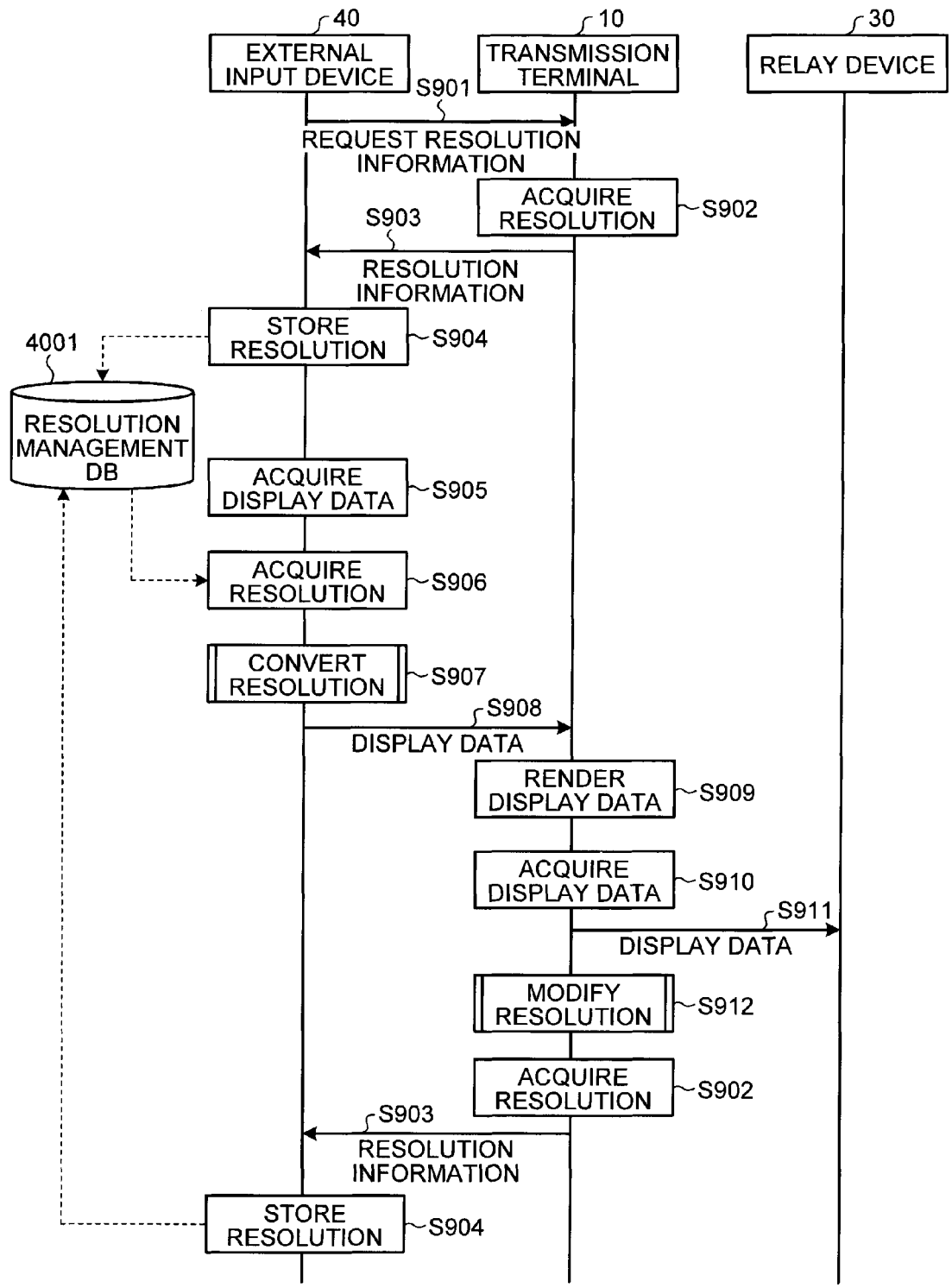
FIG. 29 is a sequence diagram illustrating an example (where an uncompressed format is used) of a process in which the external input device converts the resolution of the display data to be transmitted to the transmission terminal based on a display resolution of the transmission terminal and a display resolution of the external input device.
Figure 30:
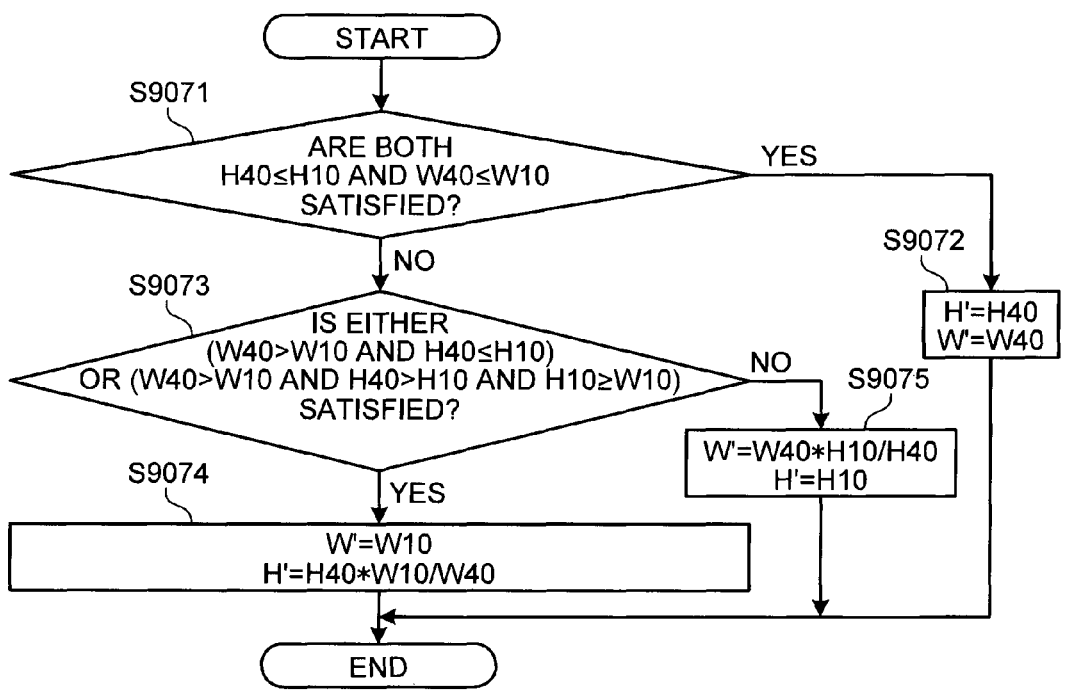
FIG. 30 is a flow chart illustrating an example of the process of converting the resolution.
Figure 31A:
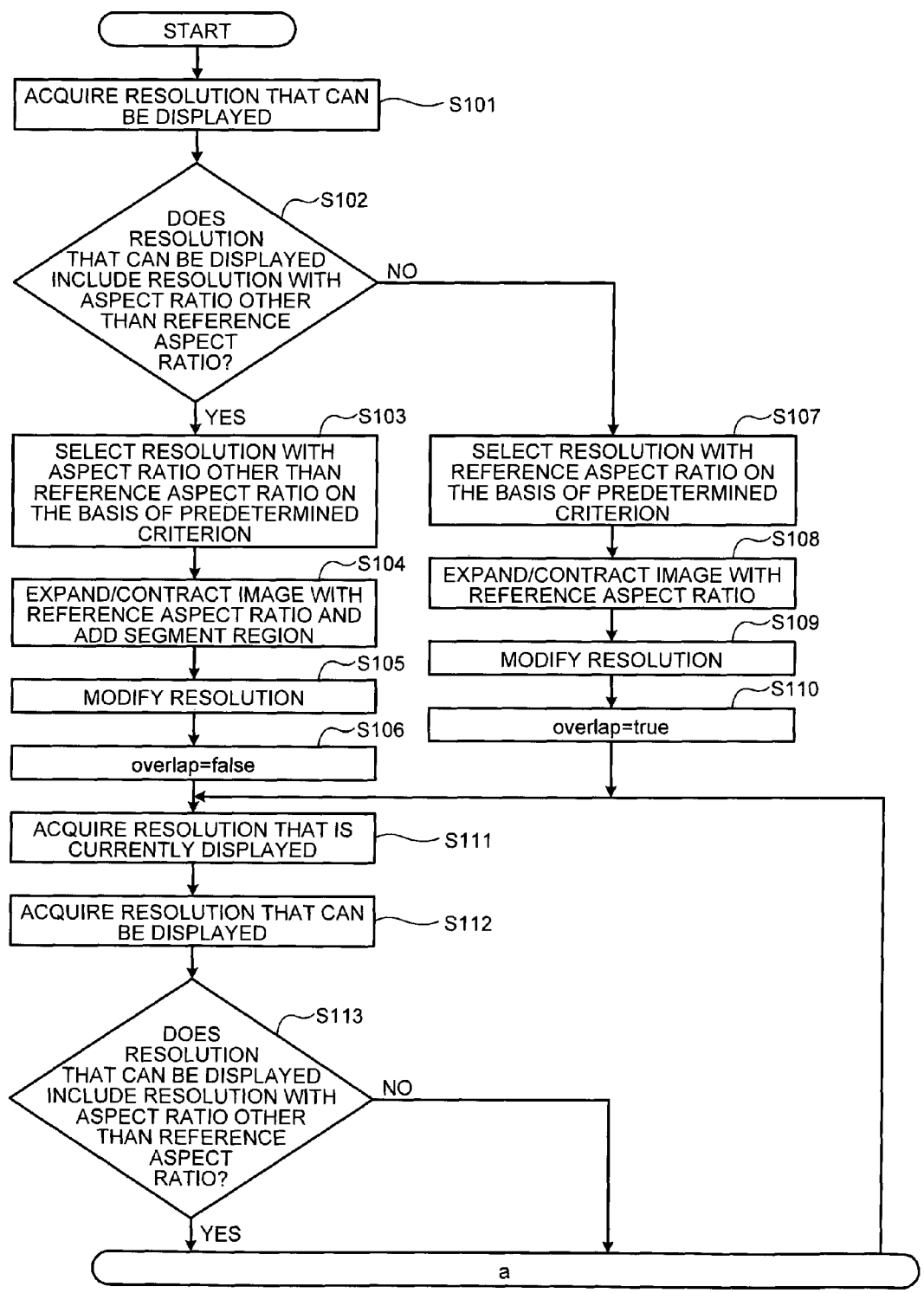
FIGS. 31A and 31B are a flowchart illustrating an example of a process of resolution control (including resolution modification) performed by the transmission terminal.
Figure 31B:
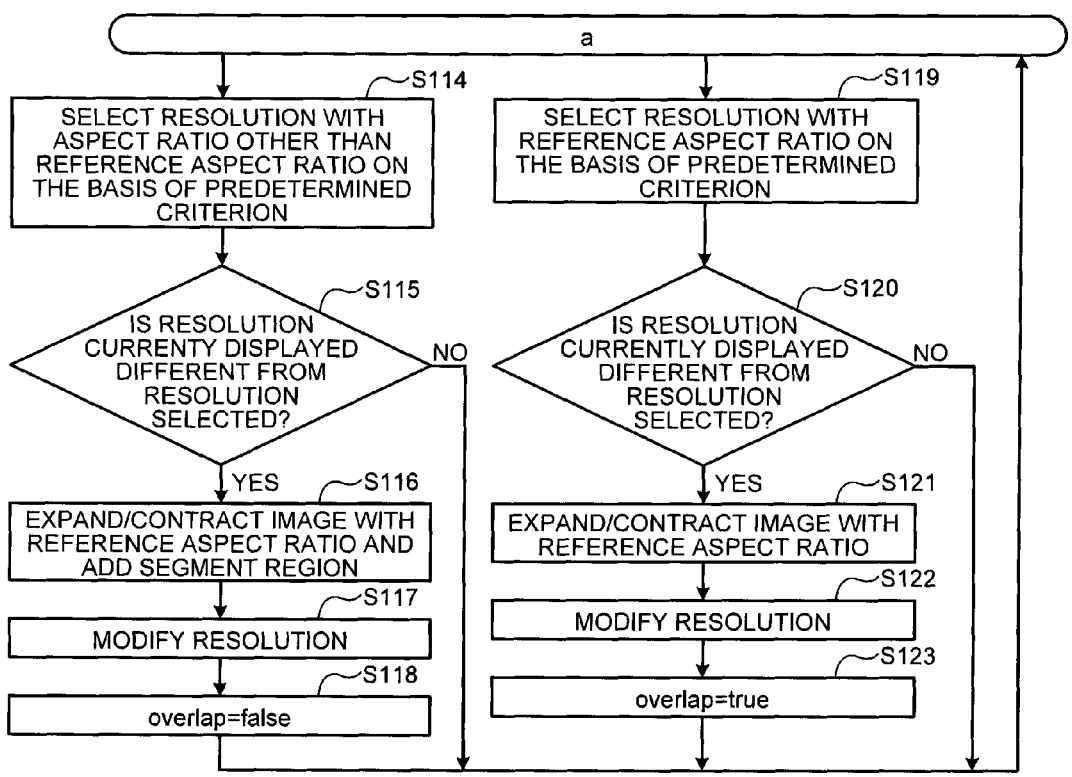
Figure 33:
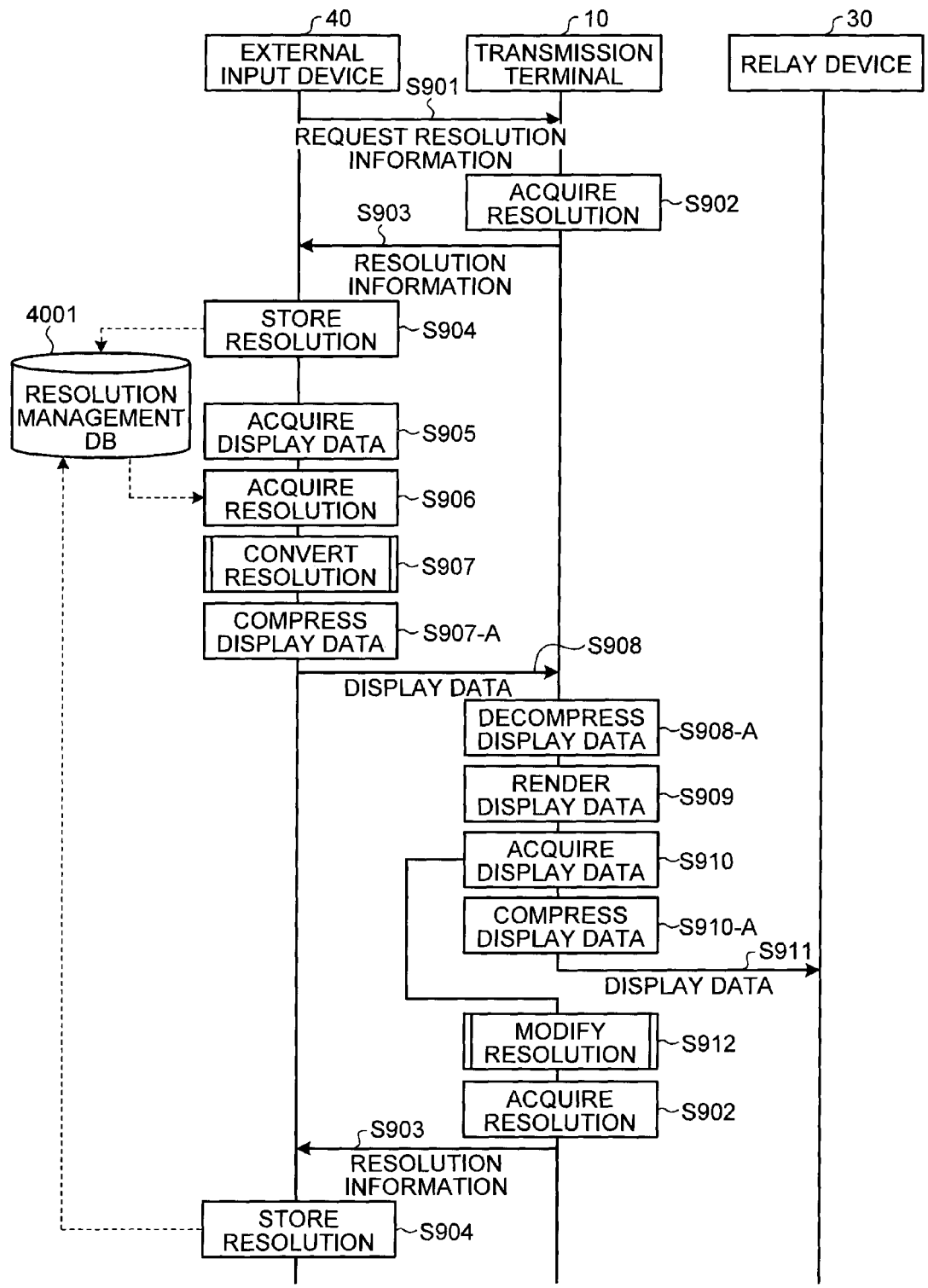
FIG. 33 is a sequence diagram illustrating another example (where a compressed format is used) of a process in which the external input device converts the resolution of display data to be transmitted to the transmission terminal based on a display resolution of the transmission terminal and a display resolution of the external input device.

FIG. 26 shows a sequence diagram illustrating an example of a process in which display data displayed in the external input device 40 is displayed in the transmission terminal 10 of the other party in a conference. FIG. 27 shows an example of a screen displayed by the external input device 40. FIG. 28 shows an example of a screen on which the image data and the display data are displayed by the transmission terminal 10. FIG. 29 shows an example (where an uncompressed format is used) of a process pertaining to the resolution modification/conversion performed by the transmission terminal 10 and the external input device 40. FIG. 30 shows an exemplary flow chart of a process of converting a resolution. FIG. 31 shows a exemplary flow chart of a process of resolution control (including the resolution modification) performed by the transmission terminal 10. FIGS. 32(a) and 32(b) show a determination process performed in step S102 of FIG. 31 and an example of a screen on which auxiliary information is displayed. FIG. 33 shows an another example (where a compressed format is used) of the process pertaining to the resolution modification/conversion performed by the transmission terminal 10 and the external input device 40.

Referring to FIG. 16, the process of managing the state information transmitted from each relay device 30 to the transmission management system 50 and representing the operation state of each relay device 30 will be described. Each of the relay devices 30 (30a to 30d) detects the operation state of own device on a regular basis by means of the state detection unit 32 (FIG. 5) (S1-1 to S1-4). In order for the transmission management system 50 to manage the operation state of each relay device 30 in real time, the transmission/reception unit 31 of each relay device 30 transmits the respective state information to the transmission management system 50 on a regular basis via the communication network 2 (steps S2-1 to S2-4). Here, each state information includes the relay device ID of the respective relay device 30 and the operation state of the relay device detected by the state detection unit 32 of the relay device 30 related to the relay device ID. Note that in the present embodiment; the relay devices 30a, 30b and 30d are "ON line" operating normally' whereas the relay device 30c is active but "OFF line" due to some trouble in a program that performs the relay operation of the relay device 30c.

Next, in the transmission management system 50, the transmission/reception unit 51 receives the respective state information transmitted from each of the relay devices 30a to 30d so that the state information is stored and managed for every relay device ID in the relay device management DB 5001 (the relay device management table in FIG. 8) of the memory unit 5000 through the store/read process unit 59 (steps S3-1 to S3-4). As a result, the operation state of the relay device indicating "ON line", "OFF line", or "out of order" is stored and managed in the relay device management table (FIG. 8) for every relay device ID. At this time, the date and time when the transmission management system 50 has received the state information is also stored and managed for every relay device ID. Note that, when no state information is transmitted from the relay device 30, a field corresponding to the operation state and a field corresponding to the reception date and time for each record in the relay device management table (FIG. 8) will be blank or include the operation state and the reception date and time stored the last time the information was received.

Referring to FIG. 17, the process in the preparatory phase before establishing communication between the transmission terminal 10*aa* and the transmission terminal 10*db* will be described. First, the power source is turned on when the operation input acceptance unit 12 (FIG. 5) accepts the power-on input from a user who has turned on the power supply switch 109 (FIG. 3) (step S21). The login request unit 13 triggered by the reception of the power-on input automatically transmits the login request information indicating the login request from the transmission/reception unit 11 to the transmission management system 50 via the communication network 2 (step S22). The login request information includes the terminal ID and the password that identify the transmission terminal 10*aa* that is the own device as a requestor. The terminal ID and the password are data read from the memory unit 1000 through the store/read process unit 19 and transmitted to the transmission/reception unit 11. The transmission management system 50 on the receiver side can know the IP address of the transmission terminal 10*aa* transmitting the login request information to the transmission management system 50.

Next, the terminal authentication unit 52 (FIG. 5) of the transmission management system 50 searches the terminal authentication management DB 5002 (the terminal authentication management table in FIG. 9) in the memory unit 5000 by using the terminal ID and the password included in the login request information received through the transmission/reception unit 51 as a search key, and authenticates the terminal by determining whether or not a terminal ID and a password identical to the search key are managed in the terminal authentication management DB 5002 (step S23). If the terminal authentication unit 52 has determined that the login request has been made by the properly authorized transmission terminal 10 whose terminal ID and the password are managed in the terminal authentication management DB, the state management unit 53 stores the terminal ID of the transmission terminal 10*aa*, the operation state, the date and time when the login request information has been received, and the IP address of the transmission terminal 10*aa* associated with each other in the terminal management DB 5003 (the terminal management table in FIG. 10) (step S24). Consequently, the operation state "ON line", the reception date and time "2009.11.10. 13:40", and the terminal IP address "1.2.1.3" are managed associated with the transmission terminal ID "01*aa*" in the terminal management table (FIG. 10).

The transmission/reception unit 51 of the transmission management system 50 then transmits authentication result information indicating the authentication result obtained by the terminal authentication unit 52 to the requestor terminal 10*aa* which has made the login request, via the communication network 2 (step S25). In the present embodiment, the following description will be given for the case where the terminal authentication unit 52 has determined that the terminal has the proper use authorization.

The terminal extraction unit 54 of the transmission management system 50 searches the destination list management table (FIG. 11) by using the terminal ID "01*aa*" of the requestor terminal 10*aa* which has made the login request as the search key, and reads and extracts the terminal ID of the candidate destination terminal 10 that can communicate with the requestor terminal 10*aa* (step S26). Here, the terminal IDs "01*ab*", "01*ba*" and "01*db*" of the destination terminals 10*ab*, 10*ba* and 10*db* corresponding to the terminal ID "01*aa*" of the requestor terminal 10*aa* are extracted.

Next, the terminal state acquisition unit 55 searches the terminal management table (FIG. 10) by using the search key that is the terminal IDs ("01*ab*", "01*ba*", and "01*db*") of the candidate destination terminal 10 extracted by the terminal extraction unit 54, and acquires the operation state of each of the transmission terminals (10*ab*, 10*ba*, and 10*db*) by reading the operation state ("OFF line", "ON line", and "ON line") for every terminal ID extracted by the terminal extraction unit 54 (step S27).

Subsequently, the transmission/reception unit 51 transmits destination state information to the requestor terminal 10*aa* via the communication network 2, the destination state information including the terminal IDs ("01*ab*", "01*ba*", and "01*db*") used in step S27 as the search key and the operation states ("OFF line", "ON line", and "ON line") of the corresponding destination terminals (10*ab*, 10*ba*, and 10*db*) (step S28). The requestor terminal 10*aa* can therefore recognize the current operation states ("OFF line", "ON line", and "ON line") of the transmission terminals (10*ab*, 10*ba*, and 10*db*) which are the candidate destination terminals 10 capable of establishing communication with the requestor terminal 10*aa*.

The terminal extraction unit 54 of the transmission management system 50 searches the destination list management table (FIG. 11) by using the terminal ID "01*aa*" of the requestor terminal 10*aa* which has made the login request as the search key, and extracts the terminal ID of another requestor terminal 10 which registers the terminal ID "01*aa*" of the requestor terminal 10*aa* as the candidate destination terminal 10 (step S29). The terminal ID of the other requestor terminal 10 extracted from the destination list management table in FIG. 11 includes "01*ab*", "01*ba*", and "01*db*".

Subsequently, the terminal state acquisition unit 55 of the transmission management system 50 searches the terminal management table (FIG. 10) by using the terminal ID "01*aa*" of the requestor terminal 10*aa* which has made the login request as the search key, and acquires the operation state of the requestor terminal 10*aa* (step S30).

The transmission/reception unit 51 then transmits the destination state information acquired in step S30 and including the terminal ID "01*aa*" and the operation state "ON line" of the requestor terminal 10*aa* to the transmission terminals (10*ba* and 10*db*) that are "ON line" as illustrated in the terminal management table (FIG. 10) among the transmission terminals (10*ab*, 10*ba*, and 10*db*) having the terminal IDs ("01*ab*", "01*ba*", and "01*db*") extracted in step S29 (steps S31-1 and S31-2). Based on the respective terminal IDs ("01*ba*" and "01*db*"), the transmission/reception unit 51 refers to the corresponding IP address of the terminal managed in the terminal management table (FIG. 10) when transmitting the destination state information to the transmission terminals (10*ba* and 10*db*). As a result, the terminal ID "01*aa*" and the operation state "ON line" of the requestor terminal 10*aa* which has made the login request can be transmitted to each of the other destination terminals (10*db* and 10*ba*) that can establish communication with the requestor terminal 10*aa* as the destination terminal.

The description of the process performed with respect to another transmission terminal 10 will be omitted, since the process similar to what has been described in steps S22 to S31-1 and 31-2 will be performed once the operation input acceptance unit 12 (FIG. 5) accepts the power-on input from a user who has turned on the power supply switch 109 (FIG. 3) (step S21).

The process of narrowing down the relay device 30 to be used will now be described with reference to FIG. 18. The requestor terminal 10*aa* in the present embodiment can establish communication with at least one of the transmission terminals 10*ba* and 10*db* that are "ON line" according to the destination state information received in step S28, among the transmission terminals 10 as the candidate destination. The following description will be given for the case where a user of the request terminal 10*aa* has selected to start communication with the destination terminal 10*db*.

The operation input acceptance unit 12 (FIG. 5) of the transmission terminal 10*aa* first accepts the input by which the transmission terminal 10*db* has been selected as the destination when a user has depressed the operation button 108 (FIG. 3) to select the transmission terminal 10*db* (step S41). The transmission/reception unit 11 of the transmission terminal 10*aa* then transmits, to the transmission, management system 50, the start request information including the terminal ID "01*aa*" of the requestor terminal 10*aa* and the terminal ID "01*db*" of the destination terminal 10*db* and indicating that the requestor terminal desires to start communication (step S42). The transmission/reception unit 51 of the transmission management system 50 receives the start request information and at the same time upon knowing the IP address "1.2.1.3" of the requestor terminal 10*aa* which has transmitted the information. The state management unit 53 thereafter changes each field corresponding to the operation state in the record including each of the terminal IDs "01*aa*" and "01*db*" in the terminal management table (FIG. 10) of the terminal management DB 5007 to "busy", based on the terminal ID "01*aa*" of the requestor terminal 10*aa* and the terminal ID "01*db*" of the destination terminal 10*db* that are included in the start request information (step S43). The requestor terminal 10*aa* and the destination terminal 10*db* in this state have not started communication (a call) but are in the busy state. a voice or an image indicating the busy state is output if another transmission terminal 10 attempts to communicate with the requestor terminal 10*aa* or the destination terminal 10*db*.

The process of executing a session that selects the relay device 30 will now be described by referring to steps S44 to S48 (FIG. 18) and steps S61-1 to 66 (see FIG. 21). The selection session ID generation unit 56*a* (FIG. 5) of the transmission management system 50 first generates selection session ID used to execute the session that selects the relay device 30 (step S44). The session management unit 57 then stores the selection session ID "se1" generated in step S44, the terminal ID "01*aa*" of the requestor terminal 10*aa*, and the terminal ID "01*db*" of the destination terminal 10*db* associated with each other into the session management table (FIG. 12) of the memory unit 5000 (step S45).

Next, the narrow-down unit 56 primarily narrows down the relay device 30 which relays communication between the requestor terminal 10*aa* and the destination terminal 10*db* based on the relay device management DB 5001, the terminal management DB 5003, and the priority management DB 5006 (step S46).

The process of "narrowing down the relay device" in step S46 will be described in more detail with reference to FIG. 19. First, the terminal IP address extraction unit 56*b* searches the terminal management table (FIG. 10) based on the terminal ID "01*aa*" of the requestor terminal 10*aa* and the terminal ID "01*db*" of the destination terminal 10*db* included in the start request information transmitted from the requestor terminal 10*aa*, and extracts the IP addresses ("1.2.1.3" and "1.3.2.4") of the corresponding transmission terminals (10*aa* and 10*db*) (step S46-1). The primary selection unit 56*c* thereafter selects each of the relay device IDs (111*a*, 111*b*, and 111*d*) of the relay devices (30*a*, 30*b*, and 30*d*) that are "ON line" from among the respective relay devices 30 managed in the relay device management table (FIG. 8) (step S46-2). The primary selection unit 56*c* further searches the relay device management table (FIG. 8) based on the IP address "1.2.1.3" of the requestor terminal 10*aa* and the IP address "1.3.2.4" of the destination terminal 10*db* extracted in step S46-1 to examine whether or not the dot address of each of the IP addresses ("1.2.1.3" and "1.3.2.4") of the requestor terminal 10*aa* and the destination terminal 10*db* is identical to the dot address of each of the IP addresses ("1.2.1.2.", "1.2.2.2" and "1.3.2.2") of the relay devices (30*a*, 30*b*, and 30*d*) that are selected in step S46-2 (step S46-3).

The priority determination unit 56*d* then determines the address priority point for each of the relay devices (30*a*, 30*b*, and 30*d*) examined in step 46-3 by referring to the priority management table (FIG. 13) (step S46-4). An example of the result of the determination process is illustrated in FIG. 20. FIG. 20 shows a table of the priority point calculated in order to execute the process of narrowing down the relay device 30 to be used. In the example illustrated in FIG. 20, the address priority point, the transmission rate priority point, and the overall point are illustrated for every relay device ID. The address priority point includes a point for the requestor terminal 10*aa* and a point for the destination terminal 10*db* for each relay device 30. The overall point consists of the sum of the transmission rate priority point and a higher point of the address priority point.

In the present embodiment, the address priority point of the relay device 30*a* with the IP address "1.2.1.2" is "5" as illustrated in FIG. 20, because the dot address of the IP address "1.2.1.2" means "identical. identical. identical. different" in comparison with the IP address "1.2.1.3" of the requestor terminal 10*aa*. Another address priority point of the relay device 30*a* with the IP address "1.2.1.2" is "1" because the dot address of the IP address "1.2.1.2" means "identical. different. different. different" in comparison with the IP address "1.3.2.4" of the destination terminal 10*db*. The address priority point of the relay device 30*b* with the IP address "1.2.2.2" is "3" because the dot address of the IP address "1.2.2.2" means "identical. identical. different. different" in comparison with the IP address "1.2.1.3" of the requestor terminal 10*aa*. Another address priority point of the relay device 30*b* with the IP address "1.2.2.2" is "1" because the dot address of the IP address "1.2.2.2" means "identical. different. identical. different" in comparison with the IP address "1.3.2.4" of the destination terminal 10*db*. The address priority point of the relay device 30*d* with the IP address "1.3.2.2" is "1" because the dot address of the IP address "1.3.2.2" means "identical. different. different. different" in comparison with the IP address "1.2.1.3" of the requestor terminal 10*aa*. Another address priority point of the relay device 30*d* with the IP address "1.3.2.2" is "5" because the dot address of the IP address "1.3.2.2" means "identical. identical. identical. different" in comparison with the IP address "1.3.2.4" of the destination terminal 10*db*.

Referring to FIG. 19, the priority determination unit 56*d* searches the priority management table (FIG. 14) and determines the transmission rate priority point for each of the relay devices (30*a*, 30*b*, and 30*d*) narrowed down by the primary narrow-down process performed in step S46-2, based on the maximum data transmission rate of each relay device 30 managed in the relay device management table (FIG. 8) (step S46-5). The relay device 30a with the maximum data transmission rate of 100 (Mbps) (see FIG. 8) in the present embodiment has the transmission rate priority equal to 3 points by referring to the transmission rate priority (FIG. 14). Likewise, the relay device 30b with the calculated maximum data transmission rate of 1000 (Mbps) has the transmission rate priority equal to 5 points. The relay device 30d with the calculated maximum data transmission rate of 10 (Mbps) has the transmission rate priority equal to 1 point.

The primary selection unit 56c then selects top two relay devices 30 in terms of the overall point that is calculated by combining the higher point of the address priority points for the transmission terminals (10aa and 10db) and the transmission rate priority point for each of the relay devices (30a, 30b and 30d) (step 46-6); The relay device 30a with the relay device ID "111a" and the relay device 30b with the relay device ID "111b" are selected in the present embodiment since the overall point for each of the relay device IDs (111a, 111b, and 111d) is "8", "8", and "6" as illustrated in FIG. 20, respectively.

Upon completing the process of "narrowing down the relay device" in step S46, the transmission/reception unit 51 (FIG. 5) of the transmission management system 50 transmits narrowed-down relay device information to the destination terminal 10db through the communication network 2, the information notifying of the number of the relay devices 30 that has been selected after the narrow-down process (step S47). The narrowed-down relay device information includes the number "2" of the relay devices 30 that has been narrowed down to in step S46, the terminal ID "01aa" of the requestor terminal 10aa, and the selection session ID "se1". As a result, the transmission terminal 10db can recognize the number of the relay devices 30 and the transmission terminal 10 which has made the request to start the telephone conference in the session with the selection session ID "se1", as well as the IP address "1.1.1.2" of the transmission management system 50 which has transmitted the narrowed-down relay device information.

The transmission terminal 10db thereafter transmits reception completion information indicating that the narrowed-down relay device information has been received, from the transmission/reception unit 11 to the transmission management system 50 via the communication network 2 (step S48). The reception completion information includes the session ID "se1". As a result, the transmission management system 50 can recognize that the notification of the number of the relay devices performed in the session ID "se1" has been completed, and that the IP address of the destination terminal 10db which has transmitted the information is "1.3.2.4", simultaneously.

The process of selecting the relay device 30 by the destination terminal 10db will now be described with reference to FIG. 21. Prior to starting a telephone conference, the transmission management system 50 first transmits pre-relay request information requesting to perform relay in advance to each of the relay devices (30a and 30b) narrowed down in step S46 (steps S61-1 and 61-2). The pre-relay request information includes the session ID "se1", the IP address "01aa" of the requestor terminal 10aa, and the IP address "01db" of the destination terminal 10db. As a result, the relay devices (30a and 30b) can recognize the selection session, the requestor terminal 10, the destination terminal 10, and the IP address "1.1.1.2" of the transmission management system 50 which has transmitted the pre-relay request information.

Each of the relay devices (30a and 30b) thereafter transmits, from the transmission/reception unit 31 (FIG. 5) via the communication network 2 to the requestor terminal 10aa recognized in steps S61-1 and 61-2, pre-transmission request information requesting to transmit pre-transmission information including ping (Packet Internet Groper) to be described to each of the relay devices (30a and 30b) as the own device prior to starting the telephone conference (steps S62-1 and 62-2). The pre-transmission information includes the session ID "se1". As a result, the requestor terminal 10aa can recognize that the pre-transmission information is transmitted to each of the relay devices (30a and 30b) in the process of selecting the relay device 30 performed in the session ID "se1", and that the IP addresses of the relay devices (30a and 30b) that transmit the pre-transmission request information are "1.2.1.2" and "1.2.2.2", respectively.

Note that the transmission management system 50 informs the requestor terminal 10aa of the IP address of the destination terminal 10db not directly but through the relay device 30a as illustrated in step S61-1, while the relay device 30b requests the requestor terminal 10aa to transmit the pre-transmission request information to the own device (relay device 30b) as illustrated in step S61-2. This is to ensure security by not informing each transmission terminal 10 of the IP address of another transmission terminal 10.

Next, the requestor terminal 10aa transmits the pre-transmission information to the relay devices (30a and 30b) from the transmission/reception unit 11 via the communication network 2 (steps S63-1 and 63-2). Transmitted to the destination terminal 10db through each of the relay devices (30a and 30b) in place of the image' data and the voice data prior to transmitting the image data and the voice data, the pre-transmission information is used to measure the time required for transmitting information or data from the requestor terminal 10aa to the destination terminal 10db. The pre-transmission information also includes: the ping to confirm that the requestor terminal 10aa, the relay devices (30a and 30b) and the destination terminal 10db are connected to be able to communicate with each other; a date and time when the pre-transmission information is transmitted from the requestor terminal 10aa; and the session ID "set". As a result, each of the relay devices (30a and 30b) can recognize that the pre-transmission information has been transmitted in the session with the selection session ID "se1", and that the IP address of the requestor terminal 10aa which has transmitted the pre-transmission information is "1.2.1.3", simultaneously.

Each of the relay devices (30a and 30b) then relays the pre-transmission information to the IP address "1.3.2.4" of the destination terminal 10db included in the pre-relay request information received in steps S61-1 and 61-2 (steps S64-1 and 64-2). As a result, the destination terminal 10db can recognize that the pre-transmission information has been transmitted in the session with the session ID "se1", and that the IP addresses of the relay devices (30a and 30b) which have transmitted (relayed) the pre-transmission information are "1.2.1.2" and "1.2.2.2", respectively.

Based on the pre-transmission information, the final narrow-down unit 16 (FIG. 5) of the destination terminal 10db then narrows down the relay devices to one relay device 30 which eventually relays the image data and the voice data in the telephone conference (step S65).

Here, the process of "selecting the relay device" performed in step S65 will be described in more detail with reference to FIGS. 5 and 22. The measurement unit 16a (FIG. 5) of the final narrow-down unit 16 first measures a date and time when the transmission/reception unit 11 of the transmission terminal 10db has received each pre-transmission information relayed by each of the relay devices (30a and 30b) (step S65-1). For every pre-transmission information with the reception time thereof that has been measured, the calculation unit 16b calculates the time required for each pre-transmission information transmitted to be received, based on difference between the reception date and time and the transmission date and time that have been included in the pre-transmission information (step S65-2). The selection unit 16c then determines whether or not the number of the pre-transmission information corresponding to the number of the relay devices 30 which will perform the relay, namely "2" relay devices, has been received in the session with the session ID "se1" (step S65-3). If not all the information has been received (NO in step S65-3), the selection unit 16c determines whether or not a predetermined time period (one minute in this case) has elapsed subsequent the transmission terminal 10db received the pre-transmission information (step S65-4). The process returns to step S65-1 if the predetermined time period has not elapsed (NO in step S65-4). If it is determined to be YES in step 65-3 (all the information has been received) or to be YES in step S65-4 (the predetermined time period has elapsed), on the other hand, the selection unit 16c selects the relay device 30 in which the amount of time to relay the pre-transmission information is the shortest among the required times that have been calculated by the calculation unit 16b (step S65-5). The embodiment in FIG. 21 illustrates an example where the relay device 30a requiring less amount of time to relay the pre-transmission information than the relay device 30b has been selected.

Note that the relay device 30a is narrowed down not necessarily by the destination terminal 10db as described in the aforementioned embodiment. For example, the destination terminal 10db may transmit all the required time information to the requestor terminal 10aa or the transmission management system 50, which then narrows down the relay device 30a to one device in the end, the information indicating the time required for the pre-transmission information transmitted to be received.

Referring back to FIG. 21, the destination terminal 10db transmits selection information, which indicates that the relay device 30a has been selected, from the transmission/reception unit 11 (FIG. 5) to the transmission management system 50 via the communication network 2 (step S66). The selection information includes the session ID "se1" and the relay device ID "111a" of the selected relay device 30a. As a result, the transmission management system 50 can recognize that the relay device 30a has been selected in the session with the session ID "se1", and that the IP address of the transmission terminal 10db that has transmitted the selection information is "1.3.2.4", simultaneously.

The session management unit 57 of the transmission management system 50 then stores the relay device ID "111a" of the relay device 30a selected in the end into the field corresponding to the relay device ID of the record including the selection session ID "se1" in the session management table (FIG. 12) that is included in the session management DB 5005 (step S67-1), while the transmission/reception unit 51 transmits the relay device ID "111a" and the IP address "1.3.2.4" of the destination terminal 10db to the requestor terminal 10aa (step S67-21). The transmission/reception unit 51 of the transmission management system 50 thereafter transmits relay start request information indicating a request to start the relay, to the relay device 30a via the communication network 2 (step S68). The relay start request information includes the IP addresses ("1.2.1.3" and "1.3.2.4") of the requestor terminal 10aa and the destination terminal 10db to be relayed, respectively. The relay device 30a can therefore establish a session to communicate the low-, medium-, and high-resolution image data and the voice data between the transmission terminal 10aa and the transmission terminal 10db (step S69). The respective transmission terminals (10aa and 10db) can start the telephone conference as a result.

Note that in the aforementioned embodiment, the transmission management system 50 transmits the narrowed down relay device information to the destination terminal 10db in step S47 (FIG. 18), followed by steps S48 to S64-1/64-2 and then to the process of selecting the relay device performed by the destination terminal 10db (step S65). However, as another way to perform the aforementioned process, the transmission management system 50 may transmit the narrowed-down relay device information to the requestor terminal 10aa in step S47, for example, so that the terminal to transmit and receive the respective information is switched between the requestor terminal 10aa and the destination terminal 10db up until steps S64-1 and 64-2. This allows the requestor terminal 10aa to perform the process of selecting the relay device in place of step S65 and transmit the selection information in place of step S66.

The process of transmitting/receiving the image data and the voice data in holding a telephone conference between the requestor terminal 10aa and the destination terminal 10db will now be described with reference to FIGS. 5 and 23. The requestor terminal 10aa first transmits the image data of a subject captured by the imaging unit 14a as well as the voice data of voice input through the voice input unit 15a, from the transmission/reception unit 11 to the relay device 30a via the communication network 2 (step S81). The transmission/reception unit in the present embodiment transmits the high-quality image data having low, medium and high resolutions as illustrated in FIGS. 6(a) to 6(c) as well as the voice data. The transmission/reception unit 31 of the relay device 30a thus receives the image data having the three resolutions and the voice data. The data quality confirmation unit 33 thereafter searches the quality modification management table (FIG. 7) by using the IP address "1.3.2.4" of the destination terminal 10db as a search key, and confirms the image quality of the image data to be relayed by extracting the image quality of the image data to be relayed corresponding to the IP address (step S82). Since the image data confirmed in the present embodiment has "high image quality" that conforms to the image quality of the image data received by the transmission/reception unit 31, the image data and the voice data are transferred as it is to the destination terminal 10db (step S83). Accordingly, the transmission/reception unit 11 of the destination terminal 10db receives the image data and the voice data so that the image display control unit 14b allows the display 120 to display an image based on the image data and that the voice output unit 15b outputs voice based on the voice data.

Next, the delay detection unit 17 of the transmission terminal 10db detects, for every fixed amount of time (for example every second), a delay time experienced by the transmission/reception unit 11 in receiving the image data (step S84). The following description in the present embodiment will be given where the delay time is 200 (ms).

The transmission/reception unit 11 of the destination terminal 10db transmits delay information indicating the delay time of "200 (ms)" to the transmission management system 50 via the communication network 2 (step S85). As a result, the transmission management system 50 can recognize the delay time as well as the IP address "1.3.2.4" of the transmission terminal 10db which has transmitted the delay information.

The delay time management unit 60 of the transmission management system 50 thereafter searches the terminal management table (FIG. 10) by using the IP address "1.3.2.4" of the destination terminal 10db as a search key, extracts the terminal ID "01db" corresponding to the IP address, and stores the delay time "200 (ms)" indicated by the delay information into the field corresponding to the delay time in a record including the terminal ID "01db" in the session management table (FIG. 12) that is established in the session management DB 5005 (step S86).

Next, the quality determination unit 58 of the transmission management system 50 searches the quality management table (FIG. 15) by using the delay time "200 (ms)" as a search key, extracts the image quality "medium image quality" of the image data corresponding to the delay time, and determines the image quality to "medium image quality" (step S87).

The transmission/reception unit 51 then searches the relay device management table (FIG. 8) by using a search key that is the relay device ID "111a" stored to be associated with the terminal ID "01db" in the session management table (FIG. 12), and extracts the IP address "1.2.1.2" of the relay device 30a corresponding to the relay device ID (step S88). The transmission/reception unit 51 thereafter transmits quality information indicating the image quality of the image data that is "medium image quality" determined in step S87, to the relay device 30a via the communication network 2 (step S89). The quality information includes the IP address "1.3.2.4" of the destination terminal 10db used as the search key in step S86. As a result, the quality modification management unit 34 of the relay device 30a stores the IP address "1.3.2.4" of the destination transmission terminal 10 (the destination terminal 10db in this case) associated with the image quality "medium image quality" of the relayed image data into the quality modification management table (FIG. 7) (step S90).

Subsequently, the transmission terminal 10aa transmits the high-quality image data having low, medium and high image qualities and the voice data to the relay device 30a in a manner similar to the process performed in step S81 (step S91). Similar to the process performed in step S82, the data quality confirmation unit 33 of the relay device 30a then searches the quality modification management table (FIG. 7) by using the IP address "1.3.2.4" of the destination terminal 10db as the search key, and confirms the image quality of the relayed image data by extracting the image quality, namely the "medium image quality", of the image data to be relayed corresponding to the IP address (step S92). Since the image data confirmed in the present embodiment has the "medium image quality" which is lower than the "high image quality" of the image data received by the transmission/reception unit 31, the data quality modification unit 35 modifies the image quality of the image data by controlling the image quality from the "high image quality" to the "medium image quality" (step S93). The transmission/reception unit 31 then transmits to the transmission terminal 10db via the communication network 2 the image data, the quality of which has been changed to the "medium image quality", and the voice data' with unchanged voice quality (step S94). Accordingly, the relay device 30a can modify the quality of the image so that a participant of the telephone conference do not feel any strangeness even if a time delay of receiving the image data is caused at the destination terminal 10db.

Now, the process of transmitting the display data, which represents the image displayed on the display 216 of the external input device 40, to another transmission terminal 10 and displaying the data on the display 120 after the relay device 30 has been determined will be described with reference to FIG. 26. Here, an example will be described where information displayed in the external input device 40aa connected to the transmission terminal 10aa is to be displayed in the transmission terminal 10db that is the destination terminal.

Once the relay device 30 has been determined, the transmission/reception unit 11 of the transmission terminal 10aa receives the relay device ID "111a" and the IP address "1.3.2.4" of the destination terminal 10db transmitted by the transmission management system 50 in step S67-21. The store/read process unit 19 then stores the received relay device ID "111a" and the IP address "1.3.2.4" into the memory unit 1000' (step S67-22).

The connection detection unit 42 (FIG. 24) of the external input device 40aa detects a connection when the external input device 40aa is connected to the transmission terminal 10aa (step S70). Once the connection detection unit 42 has detected the connection between the external input device 40aa and the transmission terminal 10aa, the installation determination unit 43a determines whether the external input device 40aa includes the display data acquisition unit 451, the display data transmission unit 452, and the resolution conversion unit 453 (step S71). Specifically, the installation determination unit 43a determines whether or not the display data acquisition program 1451 (see FIG. 5), the display data transmission program 1452, and the resolution conversion program 1453 are installed in the external input device 40aa. The installation determination unit 43a determines that the external input device 40aa includes a functional part corresponding to each of the programs when the programs are installed.

When the installation determination unit 43a has determined that the external input device 40aa lacks any of the display data acquisition unit 451, the display data transmission unit 452, and the resolution conversion unit 453, the mount unit 48 mounts the memory unit 1000 of the transmission terminal 10aa (step S72). Subsequently, the program acquisition unit 43b acquires and installs a program corresponding to the functional part that is not included in the external input device 40aa from among the display data acquisition program 1451, the display data transmission program 1452 and the resolution conversion program 1453 stored in the memory unit 1000 of the transmission terminal 10 (step S73). The external input device 40aa can thus include all of the display data acquisition unit 451, the display data transmission unit 452, and the resolution conversion unit 453.

Upon completing the process in step S73, the transmission/reception unit 41 transmits, to the transmission terminal 10aa, information which requests permission to execute each of the aforementioned programs, namely, permission to operate the display data acquisition unit 451, the display data transmission unit 452, and the resolution conversion unit 453 (step S74). The display data acquisition unit 451 then acquires the display data representing the image displayed on the display 216 after the transmission/reception unit 41 has received information indicating that the request has been accepted by the transmission terminal 10aa (step S75). Subsequently, the resolution conversion unit 453 converts the resolution of the display data acquired by the display data acquisition unit 451, and the display data transmission unit 452 thereafter transmits the display data, the resolution of which has been converted, to the external information transmission/reception unit 18 of the transmission terminal 10aa (step S76). The process in which the resolution conversion unit 453 converts the resolution of the display data will be described below. Note that the process of converting the resolution by the resolution conversion unit 453 is not performed based on the operation state of the relay device 30 and the communication speed between the transmission terminal 10 and the relay device 30 unlike the aforementioned process performed based on the operation state of the relay device 30 and the communication speed between the transmission terminal 10 and the relay device 30.

After the external information transmission/reception unit 18 of the transmission terminal 10aa being the transmitter has received the display data from the external input device 40aa, the store/read process unit 19 reads the relay device ID "111a" and the IP address "1.3.2.4" of the transmission terminal 10db to be the destination terminal that are stored in the memory unit 1000 (step S77). The transmission/reception unit 11 subsequently transmits the display data, the resolution of which has been converted, and the IP address "1.3.2.4" of the transmission terminal 10db to be the destination terminal to the relay device 30 corresponding to the relay device ID "111a" read in step S74 (step S78). Upon receiving the display data transmitted from the transmission terminal 10aa in step S78, the relay device 30 modifies the image quality of the display data based on the IP address "1.3.2.4" of the destination transmission terminal 10db (step S79) and transmits the display data to the transmission terminal 10db (step S80). The detailed description of the process performed in step S77 will be omitted since it is identical to the aforementioned process of changing the quality of the voice data and the image data (steps S81 to S94 in FIG. 23). Then, the image display control unit 14b allows the display 120 to display the image represented by the display data that is transmitted from the relay device 30 and received by the transmission/reception unit 11 of the transmission terminal 10db. As illustrated by a screen display in FIG. 28, for example, the image displayed in the external input device 40aa is displayed in a left portion area on the screen, while the image data imaged by the imaging unit 14a of the transmission terminal 10aa and transmitted by the transmission/reception unit 11 is displayed in an upper right portion area on the screen. In addition, the image data imaged by the imaging unit 14a of the transmission terminal 10db is displayed in a lower right portion area on the screen.

Now, the process of converting the resolution of the display data transmitted from the external input device 40 to the transmission terminal 10 based on the resolution on the display 120 of the transmission terminal 10 and the resolution on the display 216 of the external input device 40 will be described with reference to a sequence diagram illustrated in FIG. 29. In the example illustrated in FIG. 29, the display data is transmitted in an uncompressed format.

Referring to FIG. 29, the transmission/reception unit. 41 of the external input device 40 first transmits a request for resolution information of the display 120 of the transmission terminal 10 (step S901), and the resolution acquisition unit 21a of the transmission terminal 10 acquires the resolution information which is stored in the resolution storage unit 1005 and represents the resolution on the display 120 of the transmission terminal 10 (step S902). The external information transmission/reception unit 18 then transmits, to the external input device 40, the resolution information acquired by the resolution acquisition unit 21a in step S902 (step S903). In the external input device 40, the store/read process unit 49 stores the resolution information of the display 120 of the transmission terminal 10 received by the transmission/reception unit 41 into the resolution management table included in the resolution management DB 4001 (step S904).

Next, the display data acquisition unit 451 of the external input device 40 acquires the display data representing the image that is displayed on the display 216 under control of the display control unit 47 (step S905). The resolution acquisition unit 44 further acquires the resolution information of the display 216 (step S906). The resolution conversion unit 453 thereafter converts the resolution of the display data to be transmitted to the transmission terminal 10, based on the resolution indicated in the resolution information of the display 120 of the transmission terminal 10 stored in the resolution management DB 4001 and the resolution indicated in the resolution information of the display 216 of the external input device 40 acquired in step S906 (step S907).

Here, the process of "converting the resolution" performed by the resolution conversion unit 453 in step 907 will be described with reference to FIG. 30. Note that hereinafter, for the convenience of description, the resolution in the vertical direction (height (H) direction) and the resolution in the horizontal direction (width (W) direction) included in the resolution information of the display 216 of the external input device 40 acquired in step S906 are referred to as "H40" and "W40", respectively. Likewise, the resolution in the vertical direction and the resolution in the horizontal direction included in the resolution information of the display 120 of the transmission terminal 10 stored in the resolution management DB 4001 are referred to as "H10" and "W10", respectively. The resolution conversion unit 453 converts the resolution in the vertical direction of the display data into "H'" and the resolution in the horizontal direction of the display data into "W'" based on the resolutions H40, W40, H10, and W10.

Referring to FIG. 30, the resolution conversion unit 453 first determines whether or not both conditions H40≤H10 and W40≤W10 are satisfied (step S9071). Upon determining that both conditions H40≤H10 and W40≤W10 are satisfied (YES in step S9071), the resolution conversion unit 453 does not convert the resolution while setting the resolution H' in the vertical direction of the display data to be H'=H40 and the resolution W' in the horizontal direction of the display data to be W'=W40 (step S9072).

Upon determining that both conditions H40≤H10 and W40≤W10 are not satisfied (NO in step S9071), on the other hand, the resolution conversion unit 453 determines whether or not either condition (W40>W10 and H40≤H10) or (W40>W10 and H40>H10 and H10≥W10) is satisfied (step S9073).

Upon determining that either condition (W40>W10 and H40≤H10) or (W40>W10 and H40>H10 and H10≥W10) is satisfied (YES in step S9073), the resolution conversion unit 453 converts the resolution W' in the horizontal direction of the display data into W'=W10 and the resolution H' in the vertical direction of the display data into H'=H40\*W10/W40 (step S9074). Here, W10/W40 represents a compression ratio in the width (W) direction.

Upon determining that either condition (W40>W10 and H40≤H10) or (W40>W10 and H40>H10 and H10≥W10) is not satisfied (NO in step S9073), on the other hand, the resolution conversion unit 453 converts the resolution W' in the horizontal direction and the resolution H' in the vertical direction of the display data into W'=W40\*H10/H40 and H'=H10, respectively (step S9075). Here, H10/H40 represents a compression ratio in the height (H) direction.

The resolution conversion part determines in step S9073 that (W40>W10 and H40>H10 and H10≥W10) is not satisfied when, for example, the resolution in the vertical direction on the display 216 of the external input device 40 is higher than the resolution in the vertical direction on the display 120 of the transmission terminal 10, while the resolution in the horizontal direction on the display 216 of the external input device. 40 is no higher than the resolution in the horizontal direction on the display 120 of the transmission terminal 10 (H40>H10 and W40≤W10). In another case, the resolution conversion part determines that (W40>W10 and H40>H10 and H10≥W10) is not satisfied when the resolutions in both the horizontal and vertical directions on the display 216 of the external input device 40 are higher than the respective resolutions in the horizontal and vertical directions on the display 120 of the transmission terminal 10 while the resolution on the display 120 of the transmission terminal 10 is lower in the vertical direction than the horizontal direction (W40>W10 and H40>H10 and H10<W10).

That is, in step S907, the resolution conversion unit 453 converts the resolution in the vertical direction of the display data into the resolution in the vertical direction on the display 120 of the transmission terminal 10 (H'=H10) when the resolution in the vertical direction on the display 216 of the external input device 40 is lower than the resolution in the vertical direction on the display 120 of the transmission terminal 10. The resolution conversion unit 453 further converts the resolution in the horizontal direction of the display data such that an aspect ratio of the resolution conforms with an aspect ratio of the resolution on the display 120 of the transmission terminal 10 (W'=W40*H10/H40).

The resolution conversion unit 453 converts the resolution in the horizontal direction of the display data into the resolution in the horizontal direction on the display 120 of the transmission terminal 10 (W'=W10) when the resolution in the horizontal direction on the display 120 of the transmission terminal 10 is lower than the resolution in the horizontal direction on the display 216 of the external input device 40. The resolution conversion unit 453 further converts the resolution in the vertical direction of the display data such that the aspect ratio of the resolution conforms with the aspect ratio of the resolution on the display 120 of the transmission terminal 10 (H'=H40*W10/W40).

Referring back to FIG. 29, the display data transmission unit 452 transmits the converted display data to the transmission terminal 10 after the resolution of the display data has been converted by the resolution conversion, unit 453 (step S908).

When the external information transmission/reception unit 18 of the transmission terminal 10 has received the display data transmitted from the external input device 40 (step S908), the image display control unit 14b conducts a rendering process for the received display data and displays it on the display 120 (step S909). The display image acquisition unit 14c thereafter acquires data representing the image that is displayed on the display 120 under control of the image display control unit 14b in step S909 (step S910). The transmission/reception unit 11 then transmits the data acquired by the acquisition unit 14c to the relay device 30 (step S911).

The resolution modification unit 21d modifies the resolution on the display 120 of the transmission terminal 10 when the operation input acceptance unit 12 has received the resolution information (step S912). The "resolution modification" is performed in the process named "modify resolution" in steps S105, S109, S117, and S122 of a process flow illustrated in FIG. 31, described below.

Once the resolution has been modified, the resolution acquisition unit 21a acquires the resolution information representing the resolution that has been modified (step S902), and the external information transmission/reception unit 18 thereafter transmits the resolution information to the external input device 40 (step S903). The description of a process subsequent to step S903 will be omitted because it is similar to the process performed after step S904.

Next, the process of controlling the resolution (including the resolution modification) performed by the transmission terminal 10 will be described with reference to a flow chart illustrated in FIG. 31.

Referring to FIG. 31, once the process has been started upon turning on the power of the transmission terminal 10, the resolution acquisition unit 21a (FIG. 5) accesses to the display 120 and acquires the resolution to be displayable (step S101).

The resolution determination unit 21b then determines whether or not the resolution to be displayable includes a resolution with an aspect ratio other than a reference aspect ratio (for example 16:9 with the resolution 1280×720) used in communicating the image data between the transmission terminal 10 and the relay device 30 (step S102). This determination process is performed for the purpose of selecting, if possible, the resolution with the aspect ratio other than the reference aspect ratio and adding a segment region in which auxiliary information can be displayed. An example of a screen displayed in such case is illustrated in FIG. 32(a), in which a segment region SR is added in the lower end portion of the screen so that auxiliary information AX (an error message and an operation button) is displayed in the segment region SR. In an example illustrated in FIG. 32(b), on the other hand, the segment region is not added so that the auxiliary information AX is overlapped and displayed in the lower end portion of the screen.

When the resolution that can be displayed includes the resolution with the aspect ratio other than the reference aspect ratio (YES in step S102), the resolution selection unit 21c selects a resolution by means of a predetermined criterion from among the resolution with the aspect ratio other than the reference aspect ratio (step S103). The predetermined criterion can be set such that: the highest resolution (resolution with the greatest width×height value) is selected with higher priority; a resolution with a specific aspect ratio (for example, 8:5) is selected with higher priority; a resolution suited to a character size or the number of characters in the auxiliary information is selected; or a user defines a resolution to which higher priority is placed (for example WXGA (1280×800) and XGA (1024×768)).

An image processing unit (not illustrated) to be a function of the image display control unit 14b then expands/contracts the image internally generated with the reference aspect ratio to conform with the selected resolution and adds the segment region at the same time (step S104). The image processing unit specifically performs the following process. The image before conversion is first expanded/contracted symmetrically to conform with the width after conversion. No expansion/contraction is performed when the width of the image is the same before and after conversion (1× magnification or reduction). The height of the image after expansion/contraction is examined to add a segment region to the image after expansion/contraction such that the image has the height equal to the height after conversion. The segment region SR is added in the lower end portion of the screen in the example illustrated in FIG. 32(a). The segment region need not be added in the lower end portion but may be added in the upper end of the screen. Alternatively, the segment region having half the height may be added in the upper/lower ends of the screen.

The resolution modification unit 21d modifies the resolution on the display 120 to the selected resolution (step S105). As a result, the display 120 displays information/data with the modified resolution.

Next, a flag setting unit (not illustrated) to be a function of the image display control unit 14b sets a flag "overlap" to "false" (step S106). This flag is referred when the image display control unit 14b detects an error and displays auxiliary information separately from the image data that is currently displayed. The value of "overlap" is "true" if the auxiliary information overlaps the image data (as illustrated in FIG. 32(b)) and the value of "overlap" is "false" if the auxiliary information is controlled not to overlap the image data (as illustrated in FIG. 32(a)).

When the resolution that can be displayed does not include the resolution with the aspect ratio other than the reference aspect ratio (NO in step S102), on the other hand, the resolution selection unit 21c selects a resolution according to a predetermined criterion from among the resolution with the reference aspect ratio (step S107). The predetermined criterion is similar to what has been described in step S103.

The image processing unit (not illustrated) to be a function of the image display control unit 14b thereafter expands/contracts the image internally generated with the reference aspect ratio to the resolution that has been selected (step S108). In this case, blank region is created neither in the width direction nor in the height direction of the image data because the image, is expanded/contracted with the same aspect ratio. Therefore, the segment region is not added (see the screen display example in FIG. 32(b)).

Subsequently, the resolution modification unit 21d modifies the resolution on the display 120 to the selected resolution (step S109). As a result, the display 120 displays information/data with the modified resolution. The flag setting unit (not illustrated) to be a function of the image display control unit 14b then sets a value of the flag "overlap" to "true" (step S110).

The process having been described up to this point is initial processing performed when the transmission terminal 10 is powered on. From here on, however, loop processing is performed to deal with a case where the display 120 is switched after the power has been turned on.

The resolution acquisition unit 21a accesses to the display 120 and acquires the resolution that is currently displayed (step S111). The resolution acquisition unit 21a subsequently accesses to the display 120 and acquires the resolution that can be displayed (step S112).

The resolution determination unit 21b then determines whether or not the resolution that can be displayed includes a resolution with the aspect ratio other than the reference aspect ratio (for example 16:9) used in communicating the image data between the transmission terminal 10 and the relay device 30 (step S113). When the resolution that can be displayed includes the resolution with the aspect ratio other than the reference aspect ratio (YES in step S113), the resolution selection unit 21c selects a resolution according to a predetermined criterion from among the resolution with the aspect ratio other than the reference aspect ratio (step S114). The predetermined criterion is similar to that described in step S103.

Next, the resolution determination unit 21b determines whether or not the resolution currently displayed is different from the resolution that has been selected (step S115). When the resolution currently displayed is different from the resolution that has been selected (YES in step S115), the image processing unit (not illustrated) that is a function of the image display control unit 14b expands/contracts the image data internally generated with the reference aspect ratio to conform with the selected resolution and adds the segment region at the same time (step S116).

The resolution modification unit 21d thereafter modifies the resolution on the display 120 to the resolution that has been selected (step S117). As a result, the display 120 displays information/data with the resolution that has been modified. Next, the flag setting unit (not illustrated) to be a function of the image display control unit 14b sets the value of the flag "overlap" to "false" (step S118). Note that the process in steps S116 to S118 will not be performed when the resolution currently displayed is the same as the resolution that has been selected (NO in step S115) because there is no need to change the resolution.

When the resolution that can be displayed does not include the resolution with the aspect ratio other than the reference aspect ratio (NO in step S113), on the other hand, the resolution selection unit 21c selects a resolution according to a predetermined criterion from among the resolution with the reference aspect ratio (step S119). The predetermined criterion is similar to that described in step S103.

The resolution determination unit 21b then determines whether or not the resolution currently displayed is different from the selected resolution (step S120). When the resolution currently displayed is different from the selected resolution (YES in step S120), the image processing unit (not illustrated) to be a function of the image display control unit 14b expands/contracts the image data internally generated with the reference aspect ratio to conform with the selected resolution (step S121).

The resolution modification unit 21d subsequently modifies the resolution on the display 120 to the selected resolution (step S122). As a result, the display 120 displays information/data with the resolution that has been modified. The flag setting unit (not illustrated) to be a function of the image display control unit 14b then sets the value of the flag "overlap" to "true" (step S123). No process illustrated in steps S121 to S123 is performed when the resolution currently displayed is the same as the selected resolution (NO in step S120) because there is no need to change the resolution.

The aforementioned process is repeated while the program is being executed. This means that the process illustrated in FIG. 31 will be continued even if the transmission terminal is reconnected to another display 120 having a different resolution. While this repeated process serves to periodically monitor the change in resolution on the display 120, the process can also be executed by introducing an event mechanism that is well known by a program installed in Windows (registered trademark). In this case, an event need be registered in the program on start-up such that the event Mechanism gives event notification when the resolution has been changed upon reconnection to another display 120. The image display control unit 14b may therefore execute the process starting from step S111 in FIG. 31 every time when the event occurs.

<Main Effect Produced by Embodiment>

According to the transmission system 1 of the present embodiment, the external input device 40 is adapted to receive the resolution information when the resolution on the display 120 of the transmission terminal 10 has been changed, and to convert the resolution of the display data to be transmitted to the transmission terminal 10 based on the received information indicating the resolution that has been changed and the resolution information of the display 216 of the own device. That is, the external input device 40 is triggered by the resolution modification of the transmission terminal 10 to convert the resolution of the external input device 40 and transmit the display data, the resolution of which has been converted, to the transmission terminal 10. As a result, the problem apparent in the related art abovementioned can be solved. That is, a user need not perform the setting to convert the resolution of the external input device 40 when the display data of the external input device 40 is to be transmitted to the transmission terminal 10 by connecting the external input device 40 to the transmission terminal 10. Consequently, the burden imposed on the user to be reduced or substantially eliminated.

In response to the resolution modification performed on the transmission terminal 10 side, the external input device 40 converts the resolution of the display data before it is transmitted to the transmission terminal 10. As a result, the transmission terminal 10 need not perform the process of converting the resolution of the display data received from the external input device 40 into the resolution that suits the display 120 of the transmission terminal 10. The processing load imposed on the transmission terminal 10 can therefore be reduced.

Moreover, the external input device 40 transmits the display data to the transmission terminal 10 which establishes communication with another transmission terminal 10, so that the own device 10 is not required to manage the destination of the external input device 40 connected to the transmission terminal 10 of the other party and that the destination can be managed more easily.

The external input device 40 is further adapted to include the display data acquisition unit 451, the display data transmission unit 452 and the resolution conversion unit 453 by receiving and installing, from the transmission terminal 10, any of the display data acquisition program 1451, the display data transmission program 1452 and the resolution conversion program 1453 corresponding to the functional parts 451, 452 and/or 453 missing in the external input device. Consequently, it is possible to transmit, to the transmission terminal, the display data representing the image displayed on the display 216 of the external input device 40.

Even if obtaining the environment of the LAN 2, for example the IP address of the relay device 30, via the communication network 2 is possible, it is difficult to obtain the environment of Internet 2i as well. Now, the present embodiment can narrow the plurality of relay devices 30 down to one that can relay the pre-transmission information the fastest in practice by first narrowing the plurality of relay devices 30 that relays the image data and the voice data down to two devices based on the environment information available, and thereafter transmitting/receiving the pre-transmission information in place of the image data and the voice data prior to actually transmitting/receiving the image data and the voice data among the plurality of transmission terminals 10.

That is, the plurality of candidate relay devices 30 can be narrowed down to two or more devices to be used in the end by selecting the two or more relay devices 30 with the IP addresses that are closest to any of the IP addresses of the transmission terminals 10. Subsequently, the pre-transmission information is actually transmitted/received between the requestor transmission terminal 10 and the destination transmission terminal 10 through each of the candidate relay devices 30, so that the two or more of the relay devices 30 can be narrowed down to one that has required the shortest amount of time period in relaying the pre-transmission information. As a result, the image data or the voice data having the highest quality possible can be transmitted/received under the current environment of the communication network 2.

In the present embodiment, moreover, the plurality of relay devices 30 are narrowed down to two or more devices by not only placing a high priority on the relay device 30 with the IP address close to the IP address of the transmission terminal 10 which participates in the telephone conference, but also considering the maximum data transmission rate of each relay device 30. As a result, the candidate relay device 30 tailored to the actual environment of the communication network 2 can be selected. In addition, the candidate relay device 30 tailored to the actual environment of the communication network 2 can be selected since the relay device 30 is narrowed down from among the relay devices 30 that are on line.

The display data in the present embodiment is transmitted by using a Bitmap format (uncompressed format). The image in the data may degrade only when the display data which has gone through the resolution conversion is reduced in size (step S9074 or S9075 in FIG. 30). As a result, degradation in display (degradation in image quality) when sharing the display data can be suppressed by making a small letter easier to read, for example.

Another Embodiment

FIG. 29 shows another embodiment of the present invention in which the display data is transmitted from the external input device 40 to the transmission terminal 10 and from the transmission terminal 10 to the relay device 30 in the Bitmap format (uncompressed format). On the other, hand, the display data may also be transmitted in a compressed format for example JPEG or GIF.

An example of a process performed in the compressed format will be described with reference to FIG. 33. The process flow illustrated in FIG. 33 differs from the process flow illustrated in FIG. 29 in that a process related to compression and decompression of the display data (steps S907-A, S908-A, and S910-A) has been added. Apart from the added step, the description of the process performed in the rest of the steps will be omitted because the process is identical to that in FIG. 29.

Referring to FIG. 33, the resolution conversion unit 453 of the external input device 40 converts the resolution of the display data (step S907), and the display data acquisition unit 451 thereafter performs a predetermined compression (encoding) process on the display data, the resolution of which has been converted (step S907-A).

On the other hand, the external information transmission/reception unit 18 of the transmission terminal 10 receives the compressed display data, the resolution of which has been converted, from the external input, device 40 (step S908), so that the display image acquisition unit 14c thereafter decompresses (decodes) the compressed display data (step S908-A).

Subsequently, the image display control unit 14b conducts a rendering process for the decompressed (decoded) display data and displays it on the display 120 (step S909), so that the display image acquisition unit 14c acquires the display data displayed on the display 120 (step S910). The display data (uncompressed data) acquired here is split into two routes. The display image acquisition unit 14c performs predetermined compression (encoding) on one of the display data (step S910-A). The transmission/reception unit 11 thereafter transmits the compressed display data acquired by the display image acquisition unit 14c to the relay device 30 via the communication network 2 (step S911).

The compressed display data is further transmitted to the other transmission terminal 10 (FIG. 1) through the relay device 30. The transmission terminal 10 which has received the compressed display data can share the screen display data with the transmission terminal 10 which has transmitted the data upon subjecting the data to the predetermined decompression (decoding) by the image display control unit 14b, conducting a rendering process for the display data, and displaying the data on the display 120. That is, the transmission terminal 10 at each location can share the display data by transmitting the display data displayed in the external input device 40 to the own terminal (transmission terminal 10) and to the other transmission terminal 10.

On the other hand, the other display data from among the display data (uncompressed data) acquired by the display image acquisition unit 14c and split into two in step S910 is subjected to resolution modification in step S912. The description of the process from here on will be omitted because it is identical to that described in relation to FIG. 29.

Compared with the case where the uncompressed format, for example the Bitmap format is used (FIG. 29), the transmission capacity can be kept small when the display data, the resolution of which has been converted by the external input device 40, is transmitted (the transmission terminal 10→the relay device 30→the other transmission terminal 10) after converting it into the compressed format. Consequently, it is impossible to reduce the communication load.

<Supplementary Note to Embodiment>

The aforementioned embodiment has described an example where the external input device 40 acquires and installs a program corresponding to a functional part that is missing in the external input device 40 from the transmission terminal 10 (steps S72 and S73 in FIG. 26). As another means to implement the functional part missing in the external input device 40, for example, a program in the form of an installer that is distributed separately may be stored beforehand in a storage medium so that a user of the external input device 40 can install the program by using the storage medium.

The external input device 40 may also include any of the display data acquisition unit 451, the display data transmission unit 452, and the resolution conversion unit 453 in advance. This allows the external input device 40 to omit the process of transmitting/receiving a program corresponding to a functional part that is already included in the external input device 40 among the display data acquisition program 1451, the display data transmission program 1452, and the resolution conversion program 1453 stored in the transmission terminal 10. The load imposed on the transmission terminal 10 and the external input device 40 can be reduced as a result.

While the transmission terminal 10, the relay device 30, and the transmission management system 50 are connected to each other via the communication network 2 in the aforementioned embodiment, the communication network may also be configured to include the transmission terminal 10, the relay device 30, and the transmission management system 50. Moreover, the transmission terminal 10 transmitting/receiving various data to/from the other transmission terminal 10 through the relay device 30 in the aforementioned embodiment may also be adapted to directly transmit/receive the various data from among the plurality of transmission terminals 10 without interposing the relay device 30.

Furthermore, each of the transmission management system 50 and the program providing system 90 in the aforementioned embodiment may be constructed by a single computer or a plurality of computers to which each separated part (a function or means) is allotted randomly. A program transmitted from the program providing system 90 that is constructed by a single computer may be divided into a plurality of modules or undivided. A program from the program providing system 90 that is constructed by a plurality of computers may be transmitted from each computer while the program is divided into a plurality of modules.

The storage medium into which the program for transmission terminal, the program for relay device, and the program for transmission management are stored as well as the HD 204 into which these programs are stored and the program providing system 90 including the HD 204 in the aforementioned embodiment are used when each of the program for transmission terminal, the program for relay device, and the program for transmission management is to be provided as a program product to a user or the like within or outside the country.

The aforementioned embodiment has focused on the resolution as an example of the quality of the image of the image data that is relayed by the relay device 30 and managed in the quality modification management table (FIG. 7) and the quality management table (FIG. 15). On the other hand, for example, the quality may also be managed by focusing on a depth of the image quality of the image data; a sampling frequency of the voice in the voice data, or a bit length of the voice in the voice data. Among the reception date and time managed in the relay device management table (FIG. 8), the terminal management table (FIG. 10), and the session management table (FIG. 12), the reception time need only be managed at least.

While the IP address of the relay device and the IP address of the transmission terminal are managed in the relay device management table (FIG. 8) and the terminal management table (FIG. 10) in the aforementioned embodiment, respectively, an FQDN (Fully Qualified Domain Name) for each device or terminal may be managed instead as long as the information serves to specify the relay device 30 or the transmission terminal 10 on the communication network 2, the information here being named relay device specification information that specifies the relay device or terminal specification information that specifies the transmission terminal. In this case, an IP address corresponding to the FQDN is acquired by a known DNS (Domain Name System) server. Note that "the relay device specification information that specifies the relay device 30 on the communication network 2" may also be expressed as "relay device connection point information that indicates a connection point for the relay device 30 on the communication network 2" or "relay device destination information that indicates a destination for the relay device 30 on the communication network 2." Likewise, "the terminal specification information that specifies the transmission terminal 10 on the communication network 2" may also be expressed as "terminal connection point information that indicates a connection point for the transmission terminal 10 on the communication network 2" or "terminal destination information that indicates a destination for the transmission terminal 10 on the communication network 2."

Furthermore, the telephone conference system described as an example of the transmission system 1 in the aforementioned embodiment may also be replaced by a telephone system for example an IP (Internet Protocol) phone and an Internet phone, or by a vehicle navigation system. In this case, for example, one of the transmission terminals 10 corresponds to a vehicle navigation system mounted in a vehicle while the other transmission terminal 10 corresponds to a control terminal or a control server of a control center that controls the vehicle navigation, or a vehicle navigation system mounted in another vehicle.

In the process of acquiring the display data (step S905 in FIG. 29), the external input device 40 may acquire data corresponding to a portion displayed in a region (window) of a screen, as will be described below, instead of the data on the whole screen. FIG. 27 is a diagram illustrating an example of a screen displayed by the external input device 40. A region (window) (a) and a region (b) are displayed on the screen in this example. Any of these regions to be shared with the transmission terminal 10 of the other party is pointed by a pointer indicated by (c) in FIG. 27 while operating the mouse 212 (FIG. 4). The display data acquisition unit 451 then acquires the display data pertaining to the region (a) that has been pointed.

While the external input device 40 includes the display 216 in the aforementioned embodiment, the display 216 may also be provided as a separate unit from the external input device 40.

The invention claimed is:

1. A transmission system including a transmission terminal, a display device, another transmission terminal, and an external input device, the display device, the another transmission terminal, and the external input device being connected to the terminal device, wherein the transmission terminal comprises:
- a resolution acquisition unit configured to acquire a resolution available for the display device;
- a resolution modification unit configured to modify a resolution of the display device to a resolution selected from among the resolution available for the display device acquired by the resolution acquisition unit; and
- a resolution information transmission unit configured to transmit first resolution information, when the resolution of the display device has been modified by the resolution modification unit, to the external input device, the first resolution information representing the modified resolution, and the external input device comprises:
- a resolution information reception unit configured to receive the first resolution information transmitted from the resolution information transmission unit;
- a resolution conversion unit configured to a resolution of the display data based on the first resolution information and second resolution information representing a resolution on a display device of the external input device; and
- a display data transmission unit configured to transmit the display data whose resolution has been converted by the resolution conversion unit, to the transmission terminal in order to let the transmission terminal transmit the converted resolution to the another transmission terminal.

2. The transmission system set forth in claim 1, wherein the display data transmission unit transmits, to the transmission terminal, the display data whose resolution has been converted in an uncompressed format.

3. The transmission system set forth in claim 1, wherein the external input device further comprises a display control unit configured to covert the display data whose resolution has been converted into a compressed format, and
the display data transmission unit transmits the display data converted into the compressed format by the display control unit to the transmission terminal.

4. The transmission system set forth in claim 1, further comprising a relay device arranged between the transmission terminal and the another transmission terminal, wherein
the transmission terminal transmits, to the another transmission terminal through the relay device, the display data whose resolution has been converted and that has been transmitted from the external input device, and
the another transmission terminal conducts a rendering process for the display data whose resolution has been converted and that have been transmitted from the transmission terminal, and displays the rendering processed data on the display device of the another transmission terminal.

5. The transmission system set forth in claim 1, wherein the transmission terminal further comprises:
- a resolution determination unit configured to determine whether or not a resolution available for the display device acquired by the resolution acquisition unit includes a resolution having an aspect ratio other than a reference aspect ratio used in transmitting image data; and
- a resolution selection unit configured to select, based on the determination made by the resolution determination unit, the resolution having an aspect ratio other than the reference aspect ratio or the resolution with the reference aspect ratio, from among the resolution available for the display device.

6. The transmission system set forth in claim 1, wherein the transmission terminal further comprises:
- a display data reception unit configured to receive the display data whose resolution has been converted and that have been transmitted from the external input device; and
- a display control unit configured to display an image on the display device of the transmission terminal based on the display data received by the display data reception unit.

7. An external input device connected to a transmission terminal that is connected to another transmission terminal, the external input device comprising:
- a resolution information reception unit configured to receive first resolution information from the transmission terminal when a resolution on a display device of the transmission terminal has been modified, the first resolution information representing the modified resolution;
- a resolution conversion unit configured to convert a resolution of the display data based on the first resolution information that has been received by the resolution information reception unit and second resolution information representing a resolution on a display device of the external input device; and
- a display data transmission unit configured to transmit the display data whose resolution has been converted by the resolution conversion unit, to the transmission terminal in order to let the transmission terminal transmit the display data to the another transmission terminal.

8. The external input device set forth in claim 7, wherein the display data transmission unit transmits, to the transmission terminal in an uncompressed format, the display data whose resolution has been converted.

9. The external input device set forth in claim 7, further comprising a display control unit configured to convert the display data whose resolution has been converted into a compressed format,
wherein the display data transmission unit transmits the display data converted into the compressed format to the transmission terminal.

10. The external input device set forth in claim 7, wherein the resolution conversion unit converts the resolution of the display data into the resolution represented by the second resolution information when a resolution in a vertical direction represented in the second resolution information is not greater than a resolution in a vertical direction represented in the first resolution information, as well as a resolution in a horizontal direction represented in the second resolution information is not greater than a resolution in a horizontal direction represented in the first resolution information.

11. The external input device set forth in claim 7, wherein the resolution conversion unit converts a resolution in a horizontal direction of the display data into a resolution in a horizontal direction represented in the first resolution information when either a resolution in a horizontal direction represented in the second resolution information is higher than the resolution in the horizontal direction represented in the first resolution information, as well as a resolution in a vertical direction represented in the second resolution information is not greater than a resolution in a vertical direction represented in the first resolution information, or the resolution in the horizontal direction represented in the second resolution information is higher than the resolution in the horizontal direction represented in the first resolution information, the resolution in the vertical direction represented in the second resolution information is higher than the resolution in the vertical direction represented in the first resolution information, and the resolution in the vertical direction represented in the first resolution information is not less than the resolution in the horizontal direction represented in the first resolution information as well.

12. The external input device set forth in claim 7, wherein the resolution conversion unit converts a resolution in a vertical direction of the display data into a resolution in a vertical direction represented in the first resolution information when either a resolution in a vertical direction represented in the second resolution information is higher than the resolution in the vertical direction represented in the first resolution information, as well as a resolution in a horizontal direction represented in the second resolution information is not greater than a resolution in a horizontal direction represented in the first resolution information, or the resolution in the horizontal direction represented in the second resolution information is higher than the resolution in the horizontal direction represented in the first resolution information, the resolution in the vertical direction represented in the second resolution information is higher than the resolution in the vertical direction represented in the first resolution information, and the resolution in the vertical direction represented in the first resolution information is lower than the resolution in the horizontal direction represented in the first resolution information as well.

13. A non-transitory computer-readable storage medium with an executable program for converting display resolution by an external input device which transmits display data to a transmission terminal connected to another transmission terminal to be able to communicate therewith, wherein the program instructs a computer to execute:

receiving, from the transmission terminal, first resolution information which represents a resolution that has been modified when the resolution on a display device of the transmission terminal has been modified;

converting a resolution of the display data based on the first resolution information that has been received and second resolution information representing a resolution on a display device of the external input device; and transmitting the display data whose resolution has been converted in the procedure of converting a resolution, to the transmission terminal in order to let the transmission terminal transmit the display data from the transmission terminal to the ether another transmission terminal.

* * * * *